United States Patent [19]

Oswald et al.

[11] Patent Number: 4,522,548
[45] Date of Patent: Jun. 11, 1985

[54] AERIAL WEAPONS HANDLING TRAILER

[75] Inventors: Norman D. Oswald; Robert R. Dean, both of Duncanville; Harry S. Mankey, Dallas, all of Tex.

[73] Assignee: Standard Manufacturing Co., Inc., Dallas, Tex.

[21] Appl. No.: 426,220

[22] Filed: Sep. 28, 1982

[51] Int. Cl.³ .............................................. B60P 3/00
[52] U.S. Cl. ..................... 414/458; 414/498; 414/589; 414/917; 254/8 C
[58] Field of Search ............... 414/458, 459, 495, 589; 254/8 B, 8 C, 8 R, 9 B, 9 C, 9 R

[56] References Cited

U.S. PATENT DOCUMENTS

| | | | |
|---|---|---|---|
| 2,355,341 | 8/1944 | Trimbach | 414/728 |
| 2,454,840 | 10/1946 | Ryan | 414/743 |
| 2,836,054 | 5/1958 | Brauer | 52/125.4 |
| 2,897,989 | 8/1959 | Hounsell | 414/458 |
| 2,920,773 | 1/1960 | Knabe | 414/149 |
| 2,929,519 | 3/1960 | Taylor | 414/495 X |
| 2,934,228 | 4/1960 | Hillberg | 414/458 |
| 2,937,003 | 5/1960 | Croll | 254/93 R |
| 2,956,408 | 10/1960 | Fowler | |
| 3,341,042 | 9/1967 | Carder | 414/471 |
| 3,472,547 | 10/1969 | London | 296/190 |
| 3,727,774 | 4/1973 | Wolfe, Jr. | 414/743 |
| 3,758,076 | 9/1973 | Tranchero | 254/8 R |
| 3,972,379 | 8/1976 | Norris | 180/140 X |
| 4,122,962 | 10/1978 | Goodwin, Sr. | 414/460 |
| 4,223,693 | 9/1980 | Kosarzechi | 137/106 |

OTHER PUBLICATIONS

Drawing #60J46045 Standard Mfg. Co., Inc. Catalogue.
Drawing #T1 H201J Standard Mfg. Co., Inc. Catalogue.

Primary Examiner—Joseph E. Valenza
Assistant Examiner—Stuart J. Millman
Attorney, Agent, or Firm—Michael A. O'Neil; Gregory W. Carr

[57] ABSTRACT

An aerial weapons handling trailer includes a frame comprising longitudinally extending beams and a cross beam interconnecting the front ends of the longitudinally extending beams. The frame is supported on wheels which are pivotable between positions wherein the trailer is movable longitudinally and positioned wherein the trailer is movable laterally. The wheels include drive motors for positioning the trailer. A plurality of lift arms are pivotally supported on the longitudinally extending beams of the frame and in turn support lift beams. The lift arms include inwardly offset portions, and the lift beams are separated by a distance not greater than the width of a weapons package that is lifted and positioned by the trailer. The lift arms are actuated by hydraulic cylinders which are provided with load lock valves to prevent inadvertent lowering of the load carried by the lift beams. The hydraulic cylinders are arranged in sets, with each cylinder of each set having sufficient capacity to support the entire load regardless of the condition of the other cylinder.

19 Claims, 37 Drawing Figures

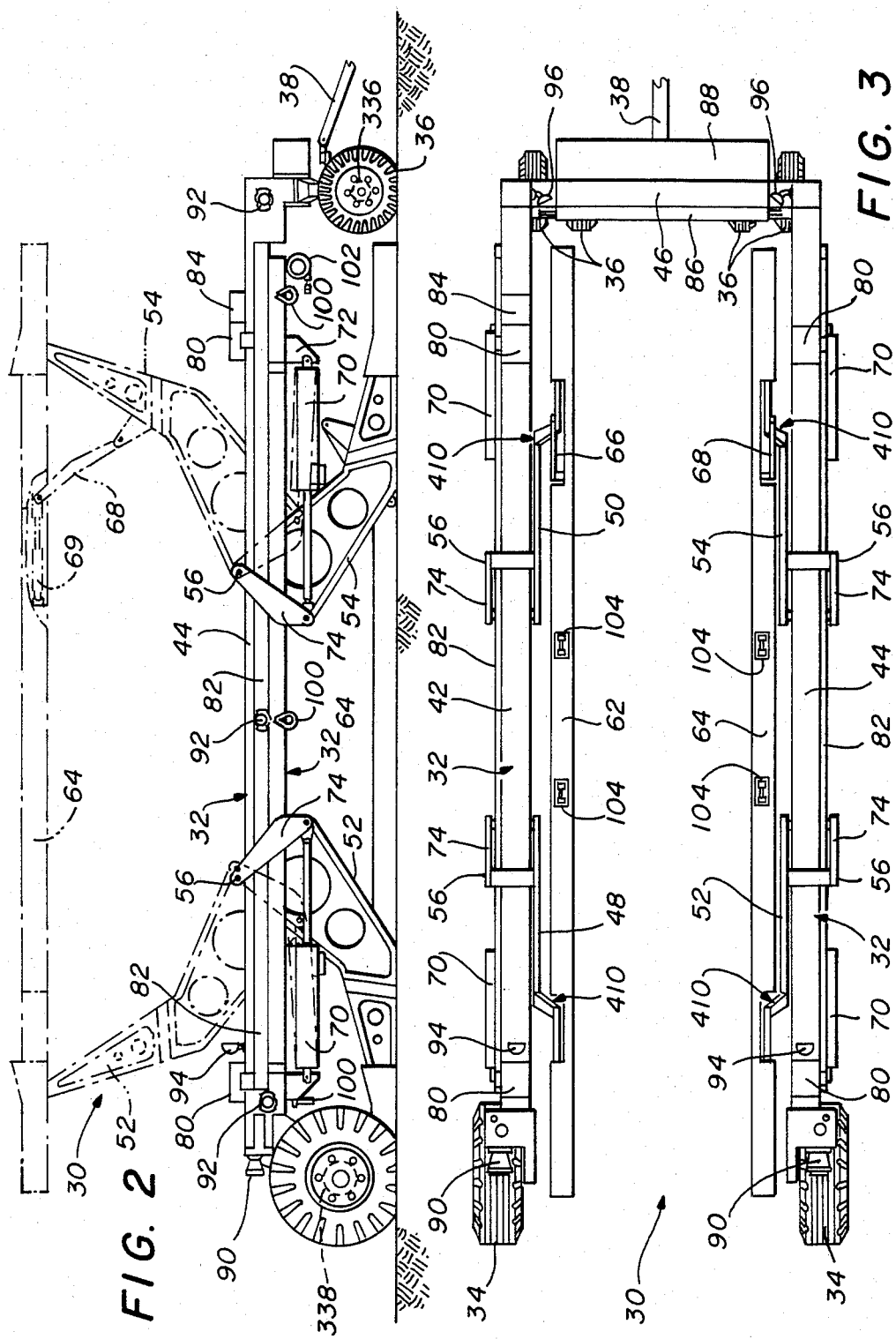

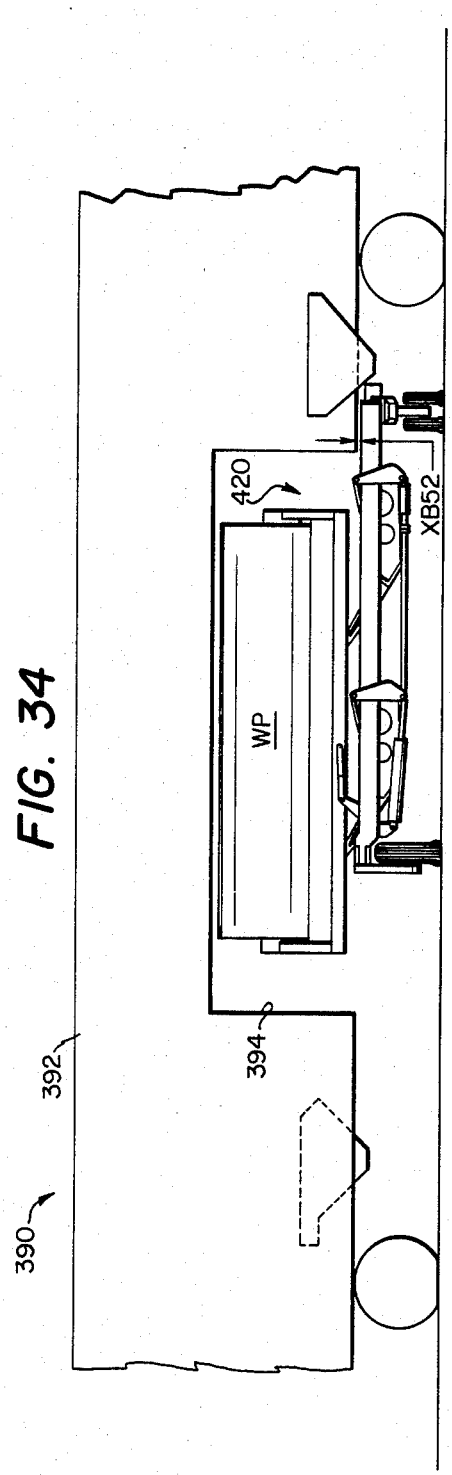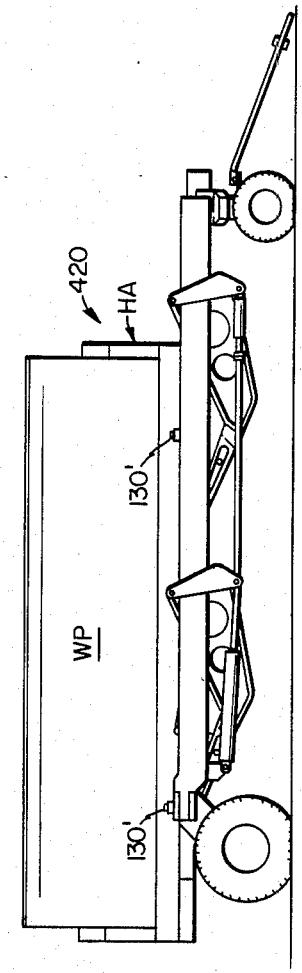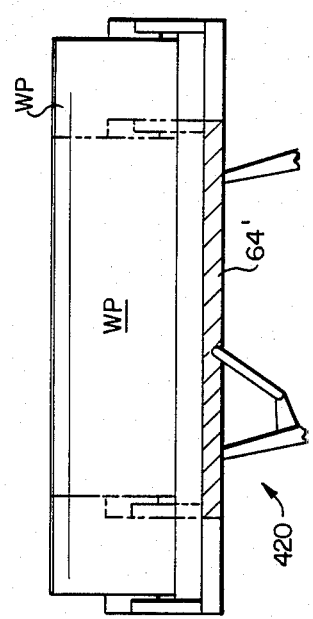

AERIAL WEAPONS HANDLING TRAILER

TECHNICAL FIELD

This invention relates generally to apparatus for receiving, transporting, lifting and positioning aerial weapons, and more particularly to an aerial weapons handling trailer adapted for use with large weapons packages.

BACKGROUND AND SUMMARY OF THE INVENTION

The loading of aerial weapons, such as bombs, rockets, and the like, into the weapons bay of an aircraft requires the transportation of each weapon from a storage location to the site of the aircraft, the lifting of the weapon into the weapons bay of the aircraft, and the positioning of the weapon in alignment with attachment lugs situated inside the weapons bay. Various devices have heretofore been provided for this purpose. For example, U.S. Pat. No. 3,727,774 granted to Maston B. Wolfe, Jr. on Apr. 17, 1973 discloses a self-propelled weapons loading apparatus.

While prior art aerial weapons loading devices have served adequately for the purpose intended, the modern practice is to group a plurality of aerial weapons into a weapons package. Weapons packages intended for use with bombers and similar aircraft may comprise a multiplicity of individual weapons grouped in a long, large diameter array weighing as much as 60,000 pounds or more. Presently available weapons handling apparatus have proven inadequate for use with large weapons packages. In particular, problems in maintaining stability and balance have been encountered due to the extreme length of such aerial weapons packages.

The present invention comprises improvements relating to aerial weapons handling trailers whereby aerial weapons packages of the type now used in bombers such as the B52 Bomber and the proposed B1 Bomber may be safely and efficiently received, transported, lifted and positioned for attachment to the aircraft. In accordance with the broader aspects of the invention the weapons package is supported on lift beams which are in turn supported on lift arms. Each lift arm has an offset portion, whereby the weapons package may be received and lifted into the weapons bay of an aircraft without the use of auxiliary lifting apparatus. The lift arms are actuated by dual hydraulic cylinders each having sufficient capacity to support the lift arm and the load carried thereby regardless of whether the other cylinder may be damaged or even entirely removed. Each of the cylinders is provided with a load lock valve so that the weapons package cannot be inadvertently lowered.

In accordance with other aspects of the invention, the aerial weapons handling trailer is provided with wheels which are normally positioned to allow the trailer to be towed in the direction of its longitudinal axis. After the trailer and the weapons package carried thereby are aligned with the weapons bay of an aircraft, the wheels are pivoted 90° to facilitate movement of the trailer perpendicularly to its longitudinal axis. Inching structure is provided for driving the wheels to effect lateral movement of the trailer. Structure is provided for varying the width of the trailer to accommodate weapons packages of various sizes. Structure is also provided for varying the longitudinal positioning of the weapons package carried by the trailer, and for selectively tilting the weapons package in order to effect proper positioning thereof.

DESCRIPTION OF THE DRAWINGS

A more complete understanding of the invention may be had by reference to the following Detailed Description when taken in conjunction with the accompanying Drawings, wherein:

FIG. 2 is a side view of the trailer of FIG. 1;

FIG. 3 is a top view of the trailer of FIG. 1;

FIG. 32 is an illustration of the trailer of FIG. 27 utilized in the transport mode;

FIG. 33 is an illustration of the use of the trailer of FIG. 27 with long and short weapons packages;

FIG. 34 is an illustration of the use of the trailer of FIG. 27 in the loading of weapons packages into the weapons bay of an aircraft;

DETAILED DESCRIPTION

Figure 1:
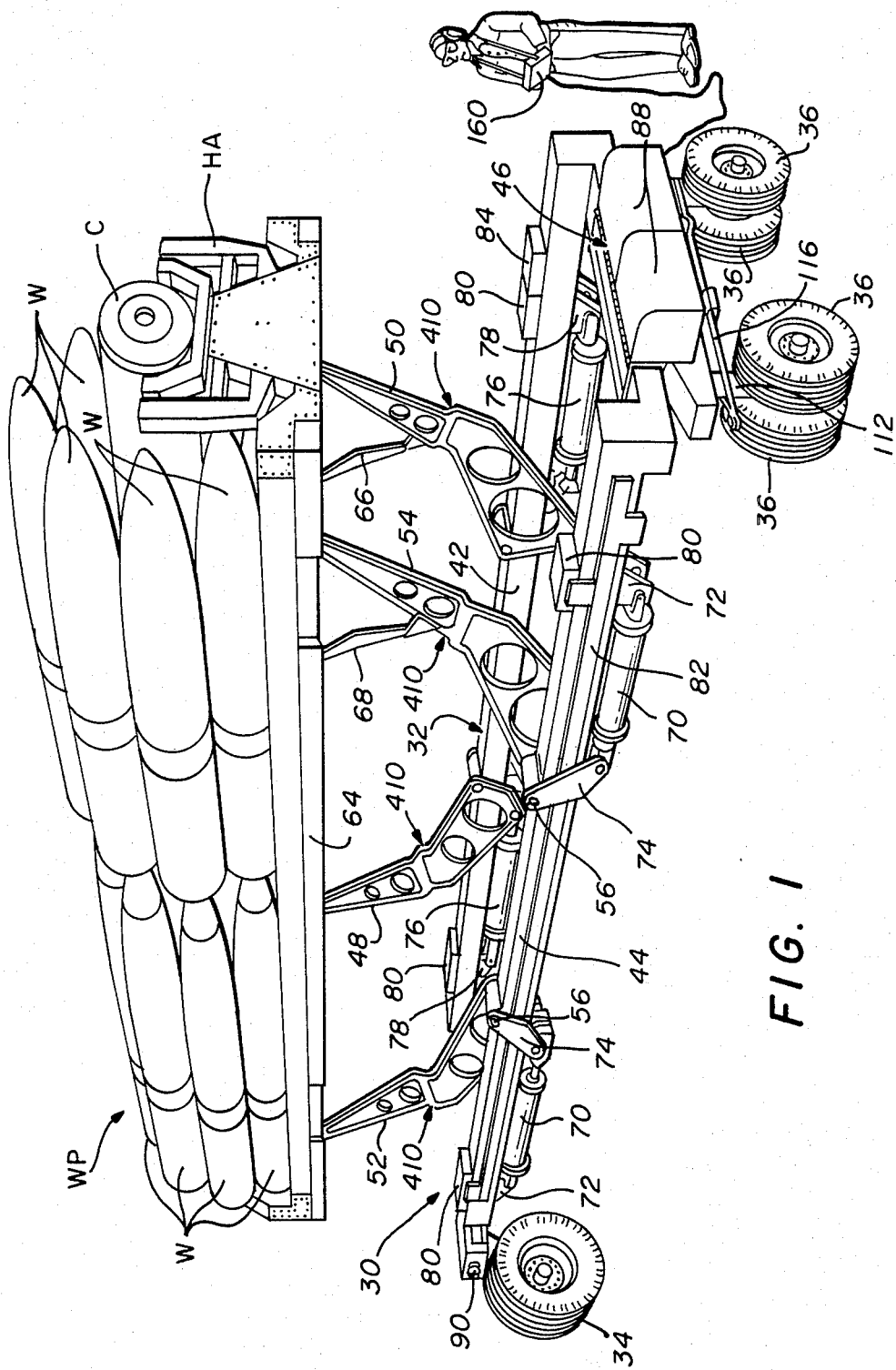
FIG. 1 is a perspective view of aerial weapons handling trailer incorporating a first embodiment of the invention.

Referring now to the Drawings, and particularly to FIG. 1 thereof, there is shown an aerial weapons handling trailer 30 incorporating a first embodiment of the invention. The trailer 30 includes a frame 32 which is supported by two rear wheels 34 and two sets of front wheels 36. The wheels 34 and 36 are supported for rotation about normally horizontally disposed axes. The axes of rotation of the wheels ordinarily extend perpendicularly to the longitudinal axis of the trailers 30, whereby the trailer is adapted to be towed in the direction of its longitudinal axis by means of a tongue 38. The wheels are also positionable as shown in FIG. 1 whereby the trailer 30 is adapted to move laterally, that is, in a direction extending perpendicular to its longitudinal axis.

In use, the trailer 30 is utilized in conjunction with large weapons packages. For example, in FIG. 1 there is shown a weapons package WP comprising a plurality of weapons W supported on a carrier C which is in turn supported by a handling adapter HA. The weapons package WP has a predetermined width which of course cannot exceed the width of the weapons bay of the aircraft that is to receive that weapons package.

The trailer 30 is initially connected to a towing vehicle by means of the tongue 38. The trailer 30 is then towed with the wheels 34 and 36 positioned to facilitate movement of the trailer in a direction extending substantially parallel to the longitudinal axis of the trailer, whereby the weapons package WP is received and transported into substantial alignment with the weapons bay of an aircraft. The wheels 34 and 36 are then positioned as shown in FIG. 1 and the trailer 30 is actuated to move laterally until the weapons package WP is positioned directly beneath the weapons bay of the aircraft. Finally, the trailer 30 is actuated to lift the weapons package WP into the weapons bay of the aircraft, whereupon the carrier C is utilized to connect the weapons package WP to attachment lugs within the weapons bay of the aircraft.

Referring now to FIGS. 2 and 3, the construction of the trailer 30 is shown in greater detail. The frame 32 of the trailer 30 comprises a pair of longitudinally extending beams 42 and 44 positioned on opposite sides of the trailer. The beams 42 and 44 have inwardly facing surfaces which are separated by a distance greater than the width of the weapons package. At the front end of the trailer the beams 42 and 44 are interconnected by a laterally extendable cross beam 46. However, the beams 42 and 44 are not interconnected at the rear end of the trailer 30, whereby the trailer 30 is adapted to receive a weapons package through the open rear end thereof.

The trailer 30 further comprises four lift arms 48, 50, 52 and 54. The lift arms 52 and 54 are pivotally supported on the beam 44 by pins 56, and the lift arms 48 and 50 are likewise pivotally supported on the beam 42 by pins 56. The lift arms 48 and 50 support a lift beam 62 extending adjacent and parallel to the beam 42, and the lift arms 52 and 54 support a lift beam 64 extending parallel and adjacent to the beam 44. The lift beams 62 and 64 have outwardly facing surfaces which are separated by a distance not greater than the width of the weapons package.

The distal ends of the lift arms 48, 50, 52 and 54 are connected to the lift beams 62 and 64 by pin and slot connections which permit both pivotal and sliding movement of the arms relative to the beams. This facilitates pivotal movement of the lift arms between the positions shown in full lines and the positions shown in phantom lines in FIG. 2, which in turn causes raising and lowering of the lift beams between the position shown in full lines and the position shown in phantom lines therein. A pair of arc compensators 66 and 68 are connected between the lift arm 50 and the lift beam 62 and between the lift arm 54 and the lift beam 64, respectively. The purpose of the arc compensators 66 and 68 is to compensate for the arcuate swing of the lift arms and thereby insure a purely vertical lift. A pair of longitudinal positioning cylinders 69 (only one of which is shown) are provided for selective actuation to vary the longitudinal positioning of an article supported on the lift beam 62 and 64.

An important feature of the present invention involves the fact that the lift arms 48, 50, 52 and 54 are connected to the lift beams 62 and 64 at points adjacent the opposite ends of the lift beams. It will be appreciated that the weight distribution of weapons packages is not always uniform either longitudinally or transversally relative to the trailer 30. It has been found that the connections of the lift arms adjacent the opposite ends of the lift beams facilitates the handling of various types of weapons packages without danger of shifting or tilting of the weapons package relative to the trailer.

Another important feature of the invention involves the fact that each of the lift arms is actuated by a pair of hydraulic cylinders. Having reference to FIGS. 1 and 5, each of the lift arms 48, 50, 52 and 54 is provided with an outboard hydraulic cylinder 70 which is connected between a bracket 72 and a bell crank 74. Each bell crank 74 is in turn connected to its associated lift arm by means of the pin 56. Each lift arm is also provided with an inboard lift cylinder 76 which is connected between a bracket 78 and the lift arm itself. It will thus be understood that in order for the lift beams 62 and 64 to be raised and lowered relative to the frame 32 of the trailer 30, all four outboard lift cylinders 70 and all four inboard lift cylinders 76 must be actuated simultaneously.

Each of the hydraulic cylinders 70 and each of the hydraulic cylinders 76 has sufficient strength and capacity to lift and support its respective portion of a load carried by the lift beams 62 and 64 notwithstanding the failure or even removal of its companion lift cylinder. For example, assume that one of the two hydraulic cylinders associated with each of the lift arms 48, 50, 52 and 54 was either totally disabled or removed. The trailer 30 would nevertheless be fully capable of receiving, transporting and lifting a weapons package by means of the lift arms.

Additionally, each of the hydraulic cylinders 70 and 76 is provided with a load lock valve. The use of load lock valves in conjunction with the hydraulic cylinders of the trailer 30 assures that a weapons package or other load carried by the lift beam 62 and 64 will not be inadvertently lowered in case of failure of the hydraulic system. To the contrary, sufficient hydraulic pressure to release the load lock valves must be provided in order to lower the load carried by the lift beams 62 and 64.

Referring again to FIGS. 2 and 3, the valves for actuating the hydraulic cylinders 70 and 76 are mounted in protective enclosures 80. Protective enclosures 82 for the electrical and hydraulic lines of the trailer 30 extend along the outside surfaces of the beams 42 and 44. An enclosure 84 is provided for housing a remote control unit for the trailer 30. Equipment compartments 86 and 88 are provided at the front end of the trailer.

Combination tail, stop, turn and blackout lights 90 are provided at the rear ends of the beams 42 and 44. A plurality of reflectors 92 are provided at longitudinally spaced points lengthwise of the beams 42 and 44. The trailer 30 is provided with four flood lights including two fixedly mounted flood lights 94 and two flood lights 96 which are mounted on self-retracting reels. A plurality of tie downs 100 are mounted at spaced apart points lengthwise of the frame 32. Self-retracting grounding cables 102 are provided on the undersides of the beams 42 and 44. The lift beams 62 and 64 are provided with detachable pickup adapters 104 for use in handling certain types of weapons packages.

Figure 4:
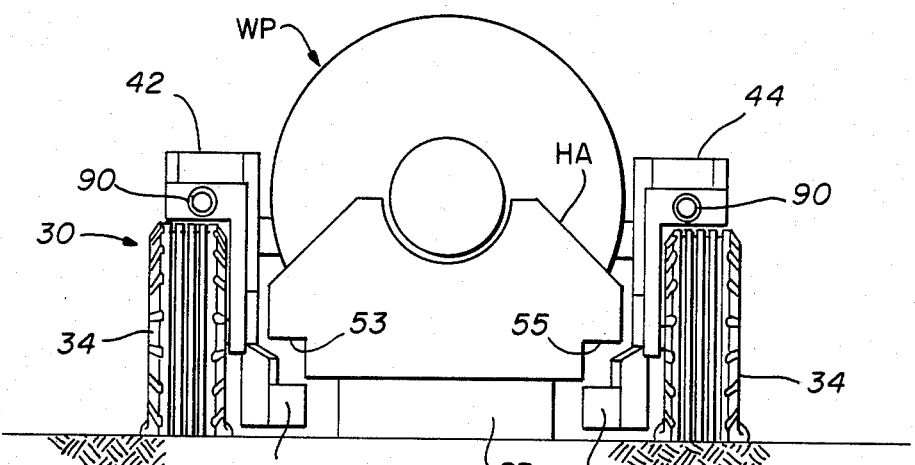
FIG. 4 is a rear end view of the trailer of FIG. 1.
Figure 5:
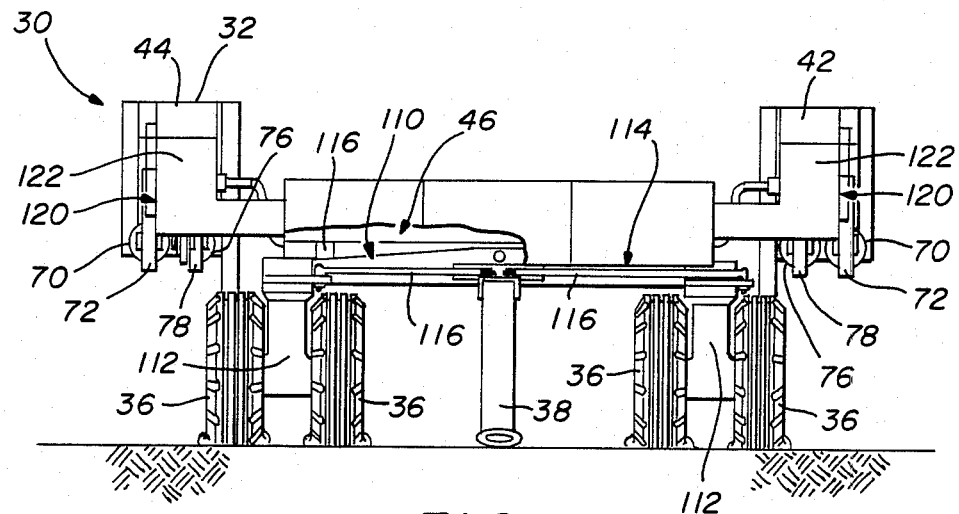
FIG. 5 is a front end view of the trailer of FIG. 1.

The normal positioning of the wheels 34 and 36 is illustrated in FIGS. 4 and 5. The front wheels 36 are mounted on a walker beam 110 which allows "walking" action of the front wheels during towing. Inverted T-shaped members 112 are supported on the walker beam 110 for pivotal movement about vertical axes. A steering mechanism 114 includes tie rods 116 which interconnect the inverted T-shaped members 112 and the tongue 38. This automotive type steering mechanism allows the trailer 30 to accurately follow behind a towing vehicle, and also allows the wheels 36 to be rotate 90° for lateral movement of the trailer. A stabilizer bar 118 is connected between the cross beam 46 and the rocker beam 110 during loading operations.

Figure 6:
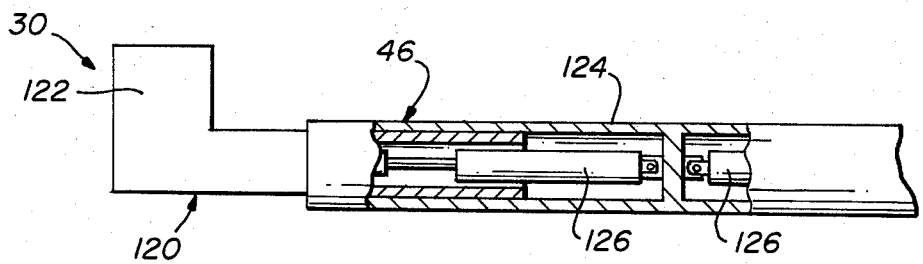
FIG. 6 is an illustration of the cross frame extension apparatus of the trailer of FIG. 1.

As is best shown in FIGS. 5 and 6, the cross beam 46 includes outboard extensions 120 having upwardly extending portions 122 which are connected to the beams 42 and 44 of the frame 32. The extensions 120 are telescopingly received in a central portion 124 of the beam 46. Hydraulic cylinders 126 are mounted within the central portion 124 and function to selectively extend and retract the extensions 120. In this manner the width of the trailer 30 can be varied for purposes of transportation, and to accomodate weapons packages of various widths.

Referring particularly to FIG. 4, the loading of a weapons package WP onto the trailer 30 is illustrated. The weapons package WP is supported on a handling adapter HA having downwardly facing support surfaces SS. The handling adapter HA may rest directly on the underlying surface, or may be supported on an underlying support SP. The lift beams 62 and 64 project inwardly with respect to the beams 42 and 44 comprising the frame 32 whereby the beams are adapted for movement between the beams 42 and 44.

By operation of the towing vehicle, the trailer 30 is initially moved into axial alignment with the weapons package WP with the rear end of the trailer 30 positioned adjacent the front end of the weapons package. The trailer 30 is then moved rearwardly so that the lift beams 62 and 64 are moved into position beneath the support surfaces ss of the handling adapter HA. The hydraulic lift cylinders 70 and 76 (not shown in FIG. 4) are then actuated to raise the lift beams 62 and 64 into engagement with the support surfaces SS. Further actuation of the hydraulic cylinders 70 and 76 raises the handling adapter HA and the weapons package WP carried thereby relative to the support SP, or the underlying surface.

Figure 7:
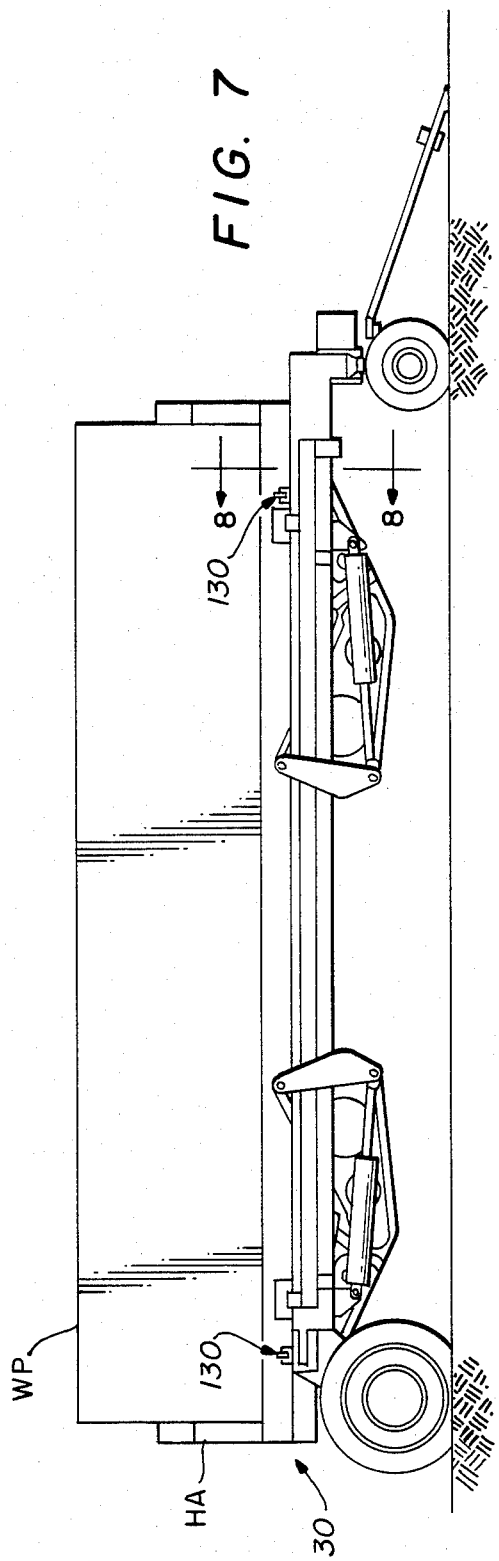
FIG. 7 is a side view of the trailer of FIG. 1 showing a weapons package mounted thereon.
Figure 8:
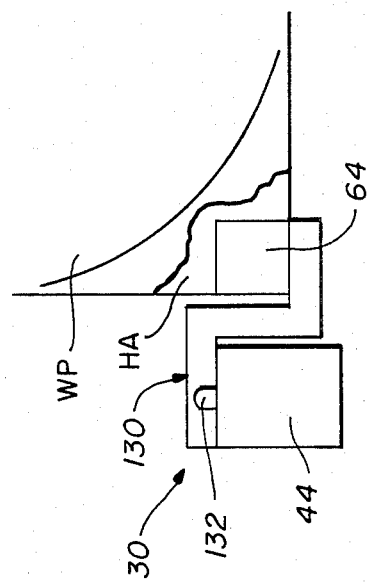
FIG. 8 is a sectional view taken along the lines 8—8 in FIG. 7.

The cylinder 70 and 76 are actuated until the lift beams 62 and 64 are positioned substantially in alignment with the beams 42 and 44. At this point the weapons package WP, the handling adapter HA and the component parts of the trailer 30 are positioned substantially as shown in FIGS. 7 and 8. Transport locks 130 may then be positioned between the beams 42 and 44 and the lift beams 62 and 64 in the manner shown in FIG. 8. The transport locks 130 are secured to the beams 44 and 42 by means of pins 132, and extend downwardly and under the adjacent lift beams 64 and 62. After the transport locks 130 are in position the cylinders 70 and 76 are actuated to lower the weapons package WP until the load beams 62 and 64 rest on the transport locks 130. In this manner the weapons package WP can be transported by the trailer 30 without the necessity of maintaining a continuous load on the hydraulic cylinders 70 and 76.

Figure 9:
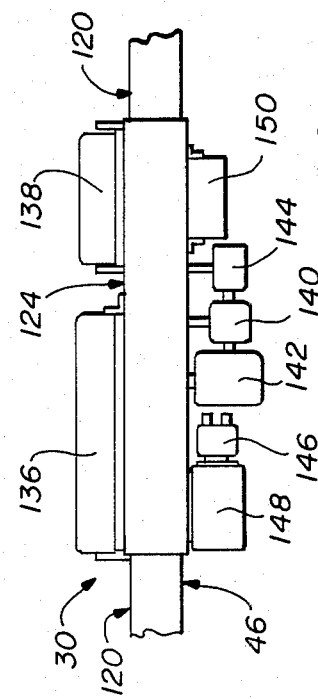
FIG. 9 is an illustration of various component parts of the trailer of FIG. 1.

FIG. 9 illustrates the cross beam 46 with the protective enclosures 86 and 88 removed. Hydraulic fluid for the hydraulic circuitry of the trailer is supplied from and returned to a hydraulic fluid reservoir 136 which is preferably constructed from stainless steel to prevent internal corrosion. A compressed air reservoir 138 is provided for supplying pneumatic pressure to operate the brakes of the trailer 30 in case the trailer should become disengaged from the towing vehicle. The braking system of the trailer 30 further includes a hydraulic master cylinder 140. An air cylinder 142 is utilized to release the brakes of the trailer during towing, and a cylinder 144 is utilized to release the brake system of the trailer during lateral movement thereof. The cylinder 144 also operates the cylinder 142 to lock the brakes of the trailer 30 when the trailer is parked.

Pressurized hydraulic fluid for actuating the various hydraulic pistons and motors comprising the trailer 30 is supplied from a hydraulic pump 146. The pump 146 is in turn driven by an electric motor 148. The remaining electrical equipment of the trailer 30 is housed within an electrical equipment enclosure 150.

Figure 10:
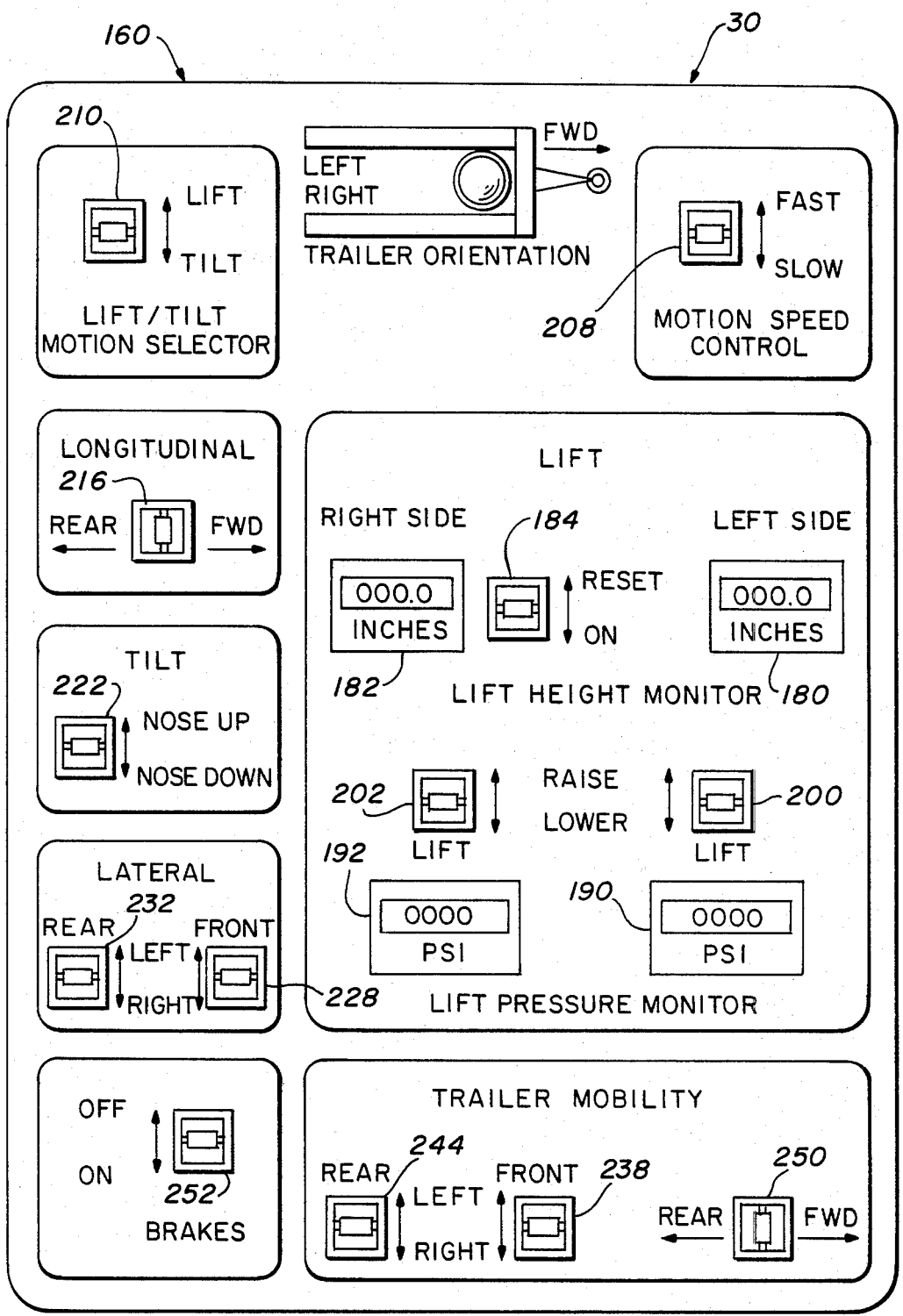
FIG. 10 is an illustration of the control unit for the trailer of FIG. 1.
Figure 11:
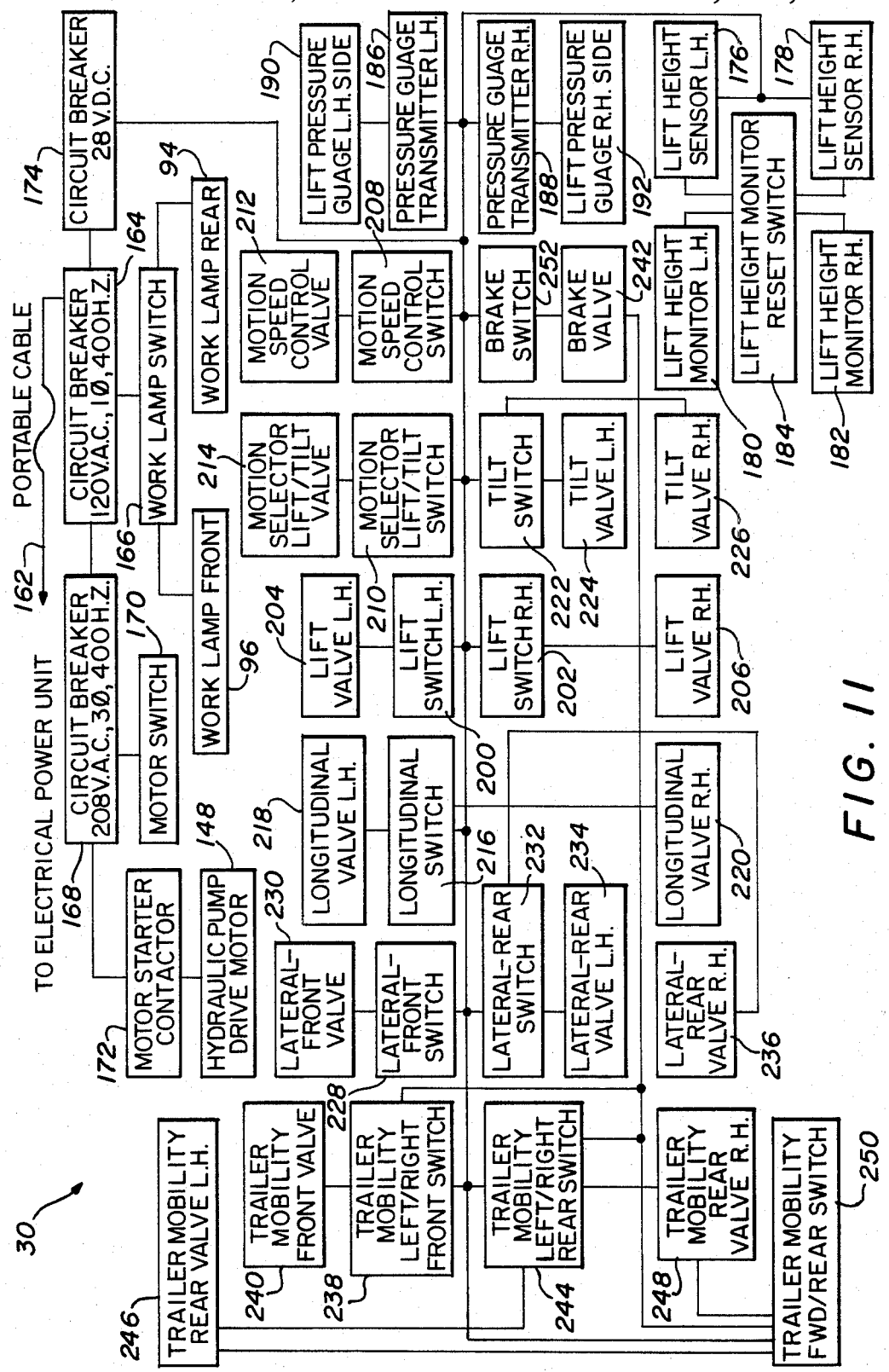
FIG. 11 is a schematic diagram showing the interconnections between the components of the control unit of FIG. 10 and the operating instrumentalities of the trailer of FIG. 1.

Referring now to FIGS. 10 and 11, FIG. 10 illustrates a remote control unit 160 utilized to control the operation of the various operating components of the trailer 30. As is best shown in FIG. 10, the remote control unit 160 comprises a number of switches and indicators. The operational relationship between these switches and indicators is most clearly shown in FIG. 11 which comprises a schematic diagram of the electrical circuitry of the trailer 30.

Electrical power is supplied through a portable cable 162. A circuit breaker 164 provides 120 v.a.c., single phase, 400 hertz electrical power for operating the flood lights 94 and 96. The flow of electrical power from the circuit breaker 164 to the flood lights 94 and 96 is controlled by a switch 166. A circuit breaker 168 supplies 208 v.a.c., three phase, 400 hertz electrical power for operating the motor 148 which in turn drives the hydraulic pump 146. Operation of the motor 148 is controlled by a switch 170 and a motor starter contactor 172. A circuit breaker 174 supplies 28 v.d.c. electrical power which operates the remaining electrical components of the trailer 30.

Referring simultaneously to FIGS. 10 and 11, the output of the circuit breaker 174 is directed to a left hand lift height sensor 176 and to a right hand lift height sensor 178 which control the operation of a left hand lift height monitor 180 and a right hand lift height monitor 182, respectively, through a lift height monitor reset switch 184. Electrical power from the circuit breaker 174 is also directed to a left hand pressure gauge transmitter 186 and to a right hand pressure gauge transmitter 188. These transmitters actuate left hand and right hand lift pressure gauges 190 and 192, respectively. The remote control unit 160 further includes left hand and right hand lift switches 200 and 202 which control the operation of left hand and right hand lift valves 204 and 206, respectively.

The remote control unit 160 is provided with motion speed control and motion selector lift/tilt switches 208 and 210. The motion speed control switch 208 in turn controls the operation of a motion speed control valve 212, and the motion selector lift/tilt switch 210 controls the operation of a motion selector lift/tilt valve 214. A longitudinal switch 216 controls the operation of left hand and right hand longitudinal valves 218 and 220. Similarly, a tilt switch 222 controls the operation of left hand and right hand tilt valves 224 and 226. A lateral front switch 228 controls the operation of a lateral front valve 230, and a lateral rear switch 232 controls the operation of a left hand lateral rear valve 234 and a right hand lateral rear valve 236.

A trailer mobility left/right front switch 238 controls the operation of a trailer mobility front valve 240 and also controls the operation of a brake valve 242. A trailer mobility left/right rear switch 244 controls the operation of a left hand trailer mobility rear valve 246, a right hand trailer mobility rear valve 248 and the brake valve 242. The brake valve 242, the left hand trailer mobility rear valve 246 and the right hand trailer mobility rear valve 248 are also actuated by a trailer mobility forward/rear switch 250. Finally, the brake valve 242 is actuated by a brake switch 252.

Figure 12:
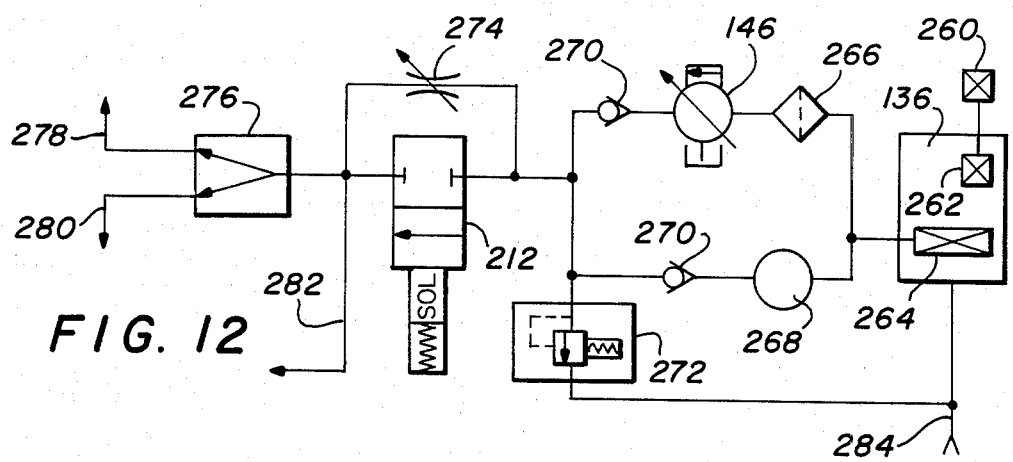
FIGS. 12, 13, 14, 15, 16, 17, 18, 19, 20 and 21 are illustrations of various portions of the hydraulic circuitry of the trailer.

The hydraulic system of the trailer 30 is illustrated in FIGS. 12 through 21, inclusive. Referring first to FIG. 12, the hydraulic fluid reservoir 136 is provided with a filler cap 260 and a filler strainer 262. The hydraulic pump 146 withdraws hydraulic fluid from the reservoir 136 through a suction strainer 264 and a ten micron filter 266. An emergency two speed hand pump 268 is provided for operating the hydraulic components of the trailer 30 in case of electrical power failure. Check valves 270 are utilized to prevent back flow either through the pump 146 or through the pump 268. The outputs from the pumps are connected to a system pressure relief valve 272.

Pressurized hydraulic fluid normally flows from the pump 146 through a variable orifice 274. Upon actuation of the motor speed control switch 208, the motor speed control valve 212 is positioned to allow high speed fluid flow. The valve 212 is actuated by a solenoid and is returned by a spring upon release of the switch 208. Hydraulic fluid from the variable orifice 274 or the valve 212 flows through a flow divider 276 and lines 278 and 280 to the hydraulic components on the left side and on the right side of the trailer 30, respectively, and also flows through a line 282 to the hydraulic components located at the front of the trailer. Spent hydraulic fluid from the various components of the trailer 30 is returned to the reservoir 136 through a line 284.

Figure 13:
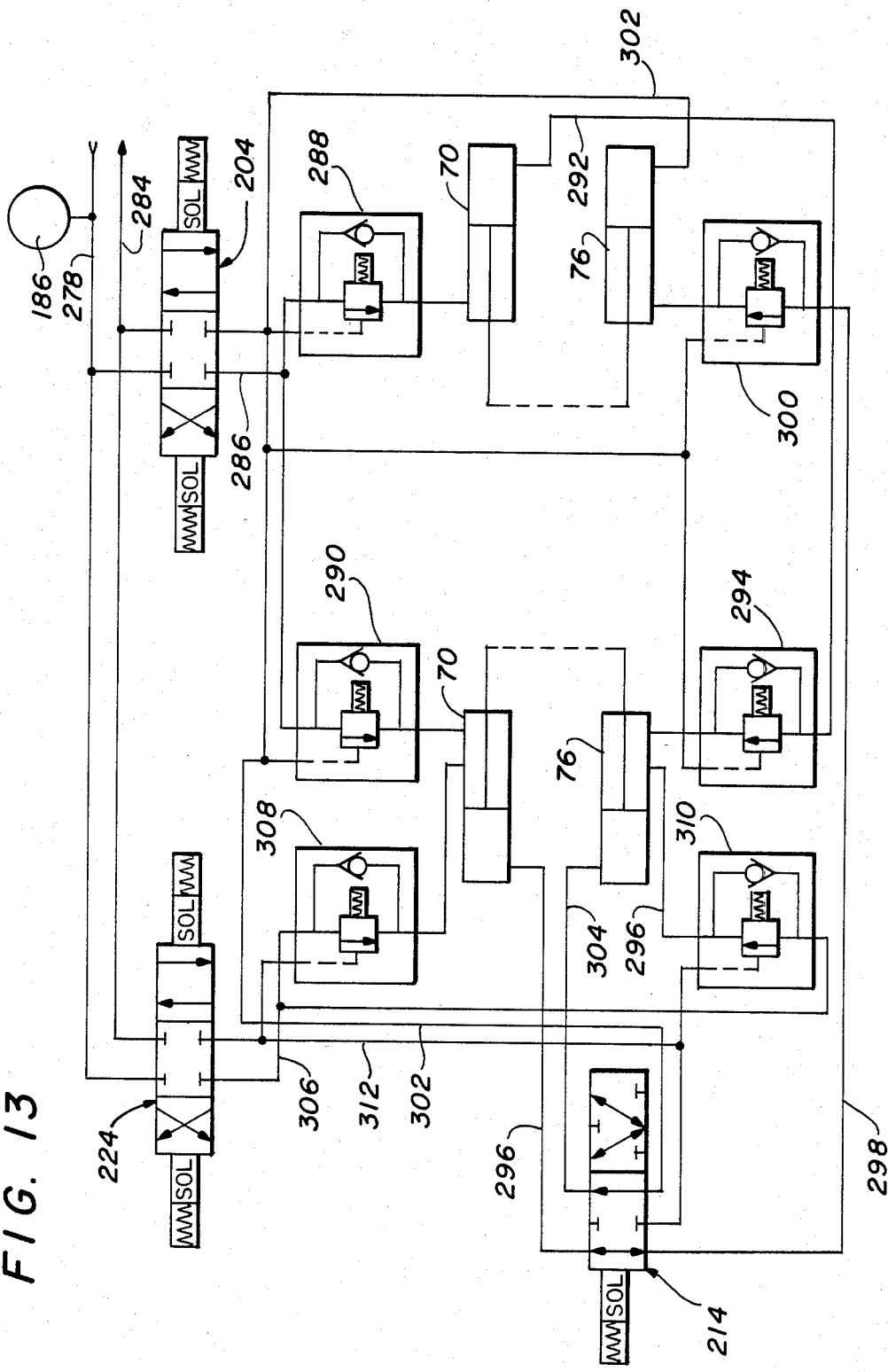

Referring now to FIG. 13, the portion of the hydraulic system of the trailer 30 which is utilized to actuate the hydraulic cylinders 70 and 76 is shown. Actually, FIG. 13 relates solely to that portion of the hydraulic system which is utilized to actuate the hydraulic cylinders 70 and 76 situated on the left side of the trailer 30. Identical hydraulic circuitry is utilized to actuate the cylinders 70 and 76 situated on the right side of the trailer.

The left-hand lift valve 204 is actuated by solenoids. Upon release of the left-hand lift switch 200 the valve 204 is spring returned to the position shown in FIG. 13. Upon actuation of the valve 204 to effect lifting, pressurized hydraulic fluid flows from the line 278 through the valve 204 to a line 286. Line 286 directs the pressurized hydraulic fluid through the check valve of a load lock valve 288 to the rod end of the hydraulic cylinder 70 situated at the front of the left side of the trailer 30. Line 286 also directs pressurized hydraulic fluid through the check valve of a load lock valve 290 to the rod end of the hydraulic cylinder 70 situated at the rear of the left side of the trailer 30.

The presence of pressurized hydraulic fluid in the rod ends of the front and rear hydraulic cylinders 70 causes the pistons of the cylinders to move from the rod ends toward the blind ends thereof. This action causes hydraulic fluid to flow out of the blind end of the front hydraulic cylinder 70 through a line 292. Hydraulic fluid from the line 292 flows through the check valve of a load lock valve 294 to the rod end of the hydraulic cylinder 76 situated at the rear of the left side of the trailer 30. Hydraulic fluid from the blind end of the hydraulic cylinder 70 situated at the rear of the left side of the trailer 30 flows through a line 296, through the motion selector lift/tilt valve 214, through a line 298 and through the check valve of a load lock valve 300 to the rod end of the hydraulic cylinder 76 situated at the front of the left side of the trailer 30. It will thus be understood that the rear hydraulic cylinder 76 is a slave to the front hydraulic cylinder 70, and that the front hydraulic cylinder 76 is a slave to the rear hydraulic cylinder 70. Spent hydraulic fluid flows out of the blind end of the front hydraulic cylinder 76 through a line 302, and hence through the valve 204 to the return line 284. Spent hydraulic fluid flows out of the blind end of the rear hydraulic cylinder 76 through the valve 214, through the line 302 and through the valve 204 to the line 284.

Assuming that the left-hand lift valve 204 is actuated to effect load lowering, the flow of hydraulic fluid to and from the hydraulic cylinders 70 and 76 is substantially the reverse of that just described with respect to the lifting mode. However, the load lock valves 288, 290, 294 and 300 normally prevent the flow of hydraulic fluid out of the rod ends of the hydraulic cylinders 70 and 76. When the valve 204 is actuated to connect the line 278 to the line 302 pressurized hydraulic fluid is directed through the line 302 to the pilot ports of the load lock valves, whereby the load lock valves are actuated to permit the flow of hydraulic fluid therethrough.

The left-hand tilt valve 224 is operated in conjunction with the motion selector lift/tilt valve 214. Each valve is adapted for solenoid actuation, with spring return to the position shown in FIG. 13.

Assuming that the valve 224 is actuated to connect the line 278 to a line 306, pressurized hydraulic fluid is directed through the check valve of a load lock valve 308 to the rod end of the hydraulic cylinder 70 situated at the rear of the left side of the trailer 30. Likewise, pressurized hydralic fluid is directed through the check valve of a load lock valve 310 to the rod end of the hydraulic cylinder 76 situated at the rear of the left side of the trailer 30. Assuming that the valve 214 is actuated to connect the lines 296 and 304 to a line 312, spent hydraulic fluid flows out of the blind ends of the hydraulic cylinders 70 and 76 situated at the rear of the left side of the trailer 30 through the valve 214, through the line 312 and through the valve 204 to the line 284. Since the hydraulic cylinders 70 and 76 situated at the front of the left side of the trailer 30 are not actuated at this time, actuation of the cylinders 70 and 76 at the rear of the left side of the trailer causes tilting of the load.

Actuation of the valve 224 to connect the line 278 to the line 312 and to connect the line 284 to the line 306 essentially causes tilting of the load in the opposite direction. However, the load lock valves 308 an 310 normally prevent the outflow of hydraulic fluid from the rod ends of the hydraulic cylinders 70 and 76 situated at the rear of the left side of the trailer 30. Since the line 312 is also connected to the pilot ports of the load lock valves 308 and 310, whenever the valve 224 is actuated to direct pressurized hydraulic fluid to the line 312 the load lock valves 308 and 310 are actuated to permit the flow of hydraulic fluid therethrough. By this means, reverse tilting of the load is faciliated.

Figure 14:
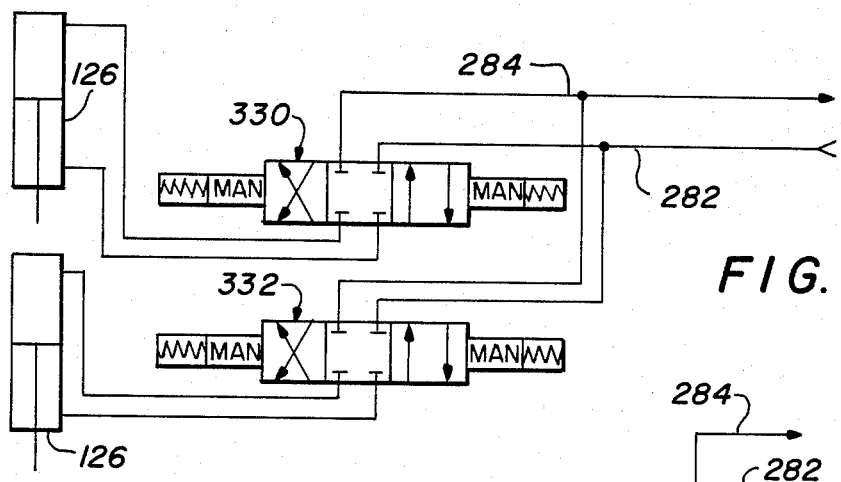

Having reference to FIG. 14, the frame extension cylinders 126 of the cross beam 46 of the trailer 30 are actuated by a pair of valves 330 and 332. The valves 330 and 332 receive pressurized hydraulic fluid from the pump 146 through the line 282 and return spent hydraulic fluid to the reservoir 136 through the line 284. Each of the valves 330 and 332 is adapted for manual actuation to selectively extend or retract its respective cylinder 126. Upon release, the valves 330 and 332 are spring returned to the positions shown in FIG. 14.

Figure 15:
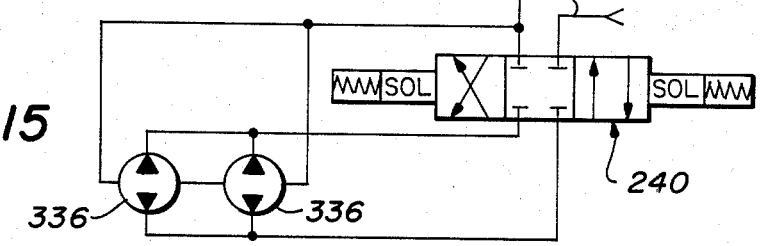
Figure 16:
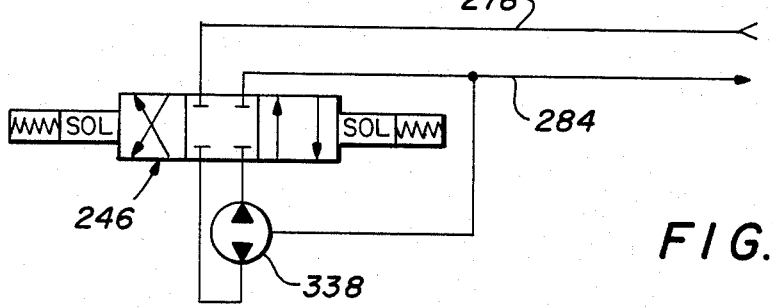

The portion of the hydraulic system of the trailer 30 which relates to the mobility of the trailer is illustrated in FIGS. 15 and 16. Referring first to FIG. 15, the trailer mobility front valve receives pressurized hydraulic fluid through the line 282 and returns spent hydraulic fluid to the reservoir 136 through the line 284. The valve 240 is adapted for solenoid actuation under the control of the trailer mobility left/right front switch 238. Upon release of the switch 238 the valve 240 is spring returned to the postion shown in FIG. 15.

Referring to FIG. 2, the valve 240 controls the flow of hydraulic fluid to and from a pair of hydraulic motors 336 which in turn drive the front wheels 36 situated on the left side of the trailer 30. The rear wheel 34 situated on the left side of the trailer 30 is driven by a hydraulic motor 338. The rear wheel 34 on the right side of the trailer 30 is driven by a similar hydraulic motor. Referring again to FIG. 16, the left hand trailer mobility rear valve receives pressurized hydraulic fluid through the line 278 and returns spent hydraulic fluid to the reservoir 136 through the line 284. The valve 246 is adapted for solenoid actuation under the control of the trailer mobility left/right rear switch 244 and also under the control of the trailer mobility forward/rear switch 250. Upon release of the switch 244 and/or the switch 250 the valve 246 is spring returned to the position shown in FIG. 16. It will be understood that the hydraulic circuitry of the trailer 30 includes a separate portion substantially identical to that shown in FIG. 16 for actuating the rear wheel 34 situated on the right side of the trailer.

Figure 17:
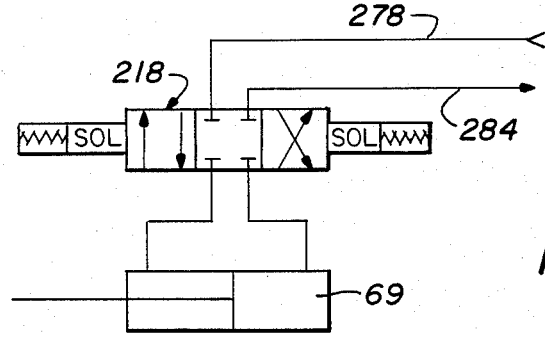

The portion of the hydraulic circuitry of the trailer 30 which actuates the longitudinal positioning cylinders 69 is shown in FIG. 17. The left hand longitudinal valve 218 receives pressurized hydraulic fluid through the line 278 and returns spent hydraulic fluid to the reservoir 136 through the line 284. The valve 218 is adapted for solenoid actuation under the control of the longitudinal switch 216. Upon release of the switch 216 the valve 218 is returned to the position shown in FIG. 17. It will be understood that the hydraulic circuitry of the trailer 30 includes a portion substantially identical to that shown in FIG. 16 for actuating the cylinder 69 on the right side of the trailer.

Figure 18:
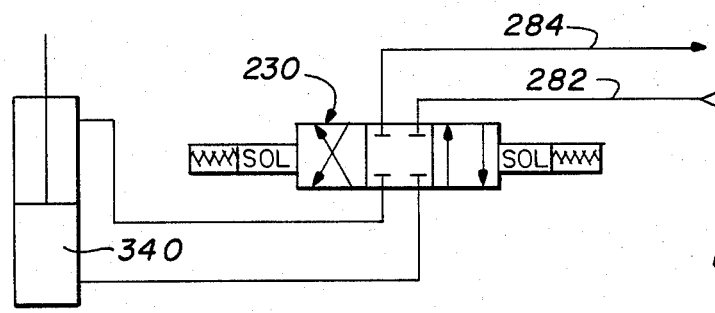
Figure 19:
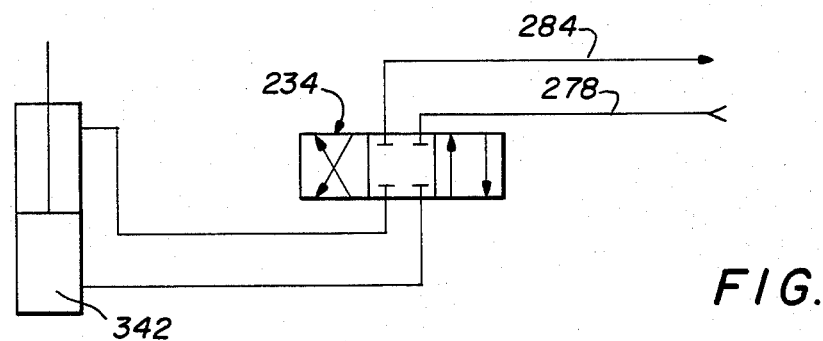
Figure 20:
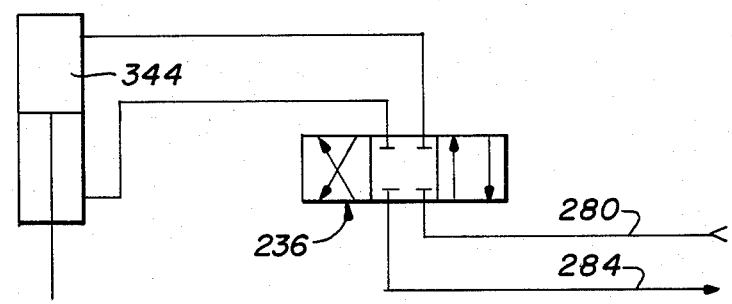

Referring to FIGS. 18, 19 and 20, the trailer 30 includes a front lateral positioning cylinder 340, a left rear lateral positioning cylinder 342 and a right rear lateral positioning cylinder 344. These cylinders correspond to the lateral front valve 230, the left hand lateral rear valve 234 and the right hand lateral rear valve 236, respectively. The valve 230 receives pressurized hydraulic fluid through the line 282, the valve 234 receives pressurized hydraulic fluid through the line 278 and the valve 236 receives pressurized hydraulic fluid through the line 280. All three valves return spent hydraulic fluid to the reservoir 136 through the line 284. The lateral positioning cylinders 340, 342 and 344 are connected between the frame of the trailer 30 and the wheels 36 and 34, respectively, and function to provide precise lateral positioning after the trailer has been initially positioned by operation of the drive motors 336 and 338.

The valve 230 is adapted for solenoid actuation under the control of the lateral front switch 228. Upon release of the switch 228 the valve 230 is spring returned to the locked position illustrated in FIG. 18. The valves 234 and 236 are adapted for solenoid actuation under the control of the lateral rear switch 232. Upon release of the switch 232 the valves 234 and 236 are returned to the positions shown in FIGS. 19 and 20 under spring action.

Figure 21:
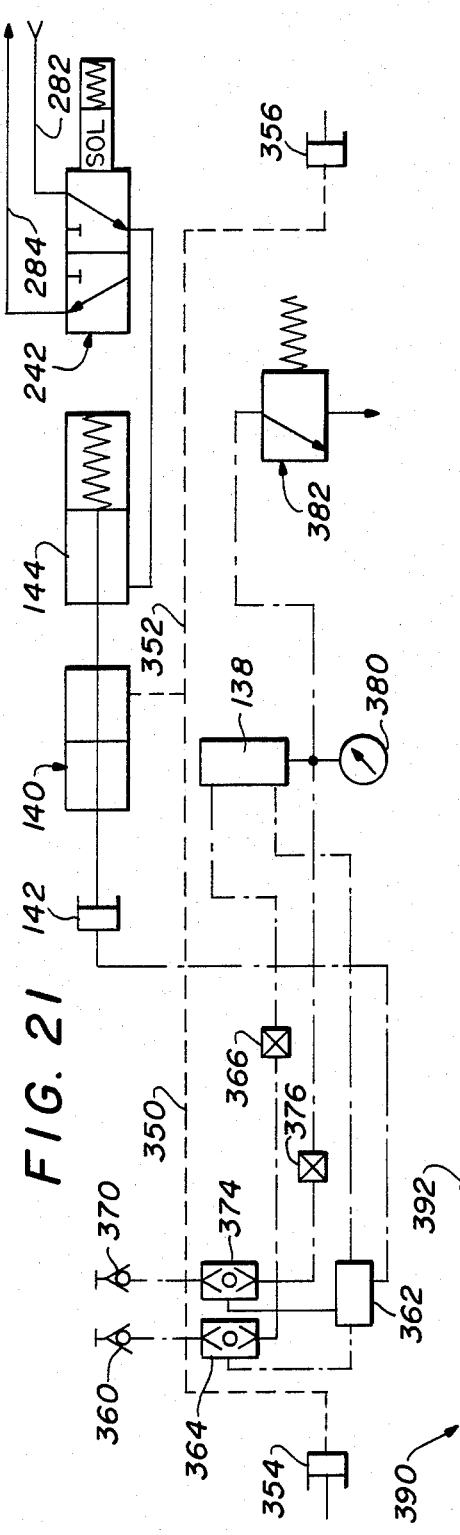

The brake system for the trailer 30 is illustrated in FIG. 21 wherein solid lines are used to designate conventional hydraulic fluid lines, dashed lines are used to designate brake fluid lines and phantom lines are used to designate pneumatic lines. The master cylinder 140 is adapted for selective actuation to either apply or release hydraulic pressure from a pair of brake lines 350 and 352 which extend from the master cylinder 140 to left and right brake assemblies 354 and 356, respectively. The master cylinder 140 is adapted for actuation either by the pneumatic cylinder 142 or by the hydraulic cylinder 144.

The hydraulic cylinder 144 operates under control of the brake valve 242. The valve 242 receives pressurized hydraulic fluid through the line 282 and returns spent hydraulic fluid to the reservoir 136 through the line 284. The valve 242 is adapted for solenoid actuation under control of the brake switch 252, the trailer mobility forward/rear switch 250, the trailer mobility left/right rear switch 244 and the trailer mobility left/right front switch 238. Upon release of these switches, the valve 242 is spring returned to the position shown in FIG. 21, wherein pressurized hydraulic fluid is directed to the cylinder 144 thereby actuating the cylinder 140 to actuate the braking assemblies 354 and 356. Conversely, upon solenoid actuation of the valve 242 hydraulic pressure is released from the cylinder 144 whereby a spring contained therein causes the master cylinder 140 to deactuate the braking assemblies 354 and 356.

The brake system of the trailer 30 further includes a pneumatic subsystem. A service air connection 360 extends to an emergency relay valve 362 through a double check valve 364. An emergency air connection 370 also connects with the emergency relay valve 362 through a double check valve 374. The pneumatic reservoir 138 is connected to the double check valve 364 through a hand valve 366 and is connected to the double check valve 374 through a two way control valve switch 376. The pneumatic subsystem further includes a pressure gauge 380 and a relief valve 382.

The pneumatic subsystem of the brake system of the trailer 30 is utilized during towing. In such instances the pneumatic cylinder 142 is utilized to actuate the master cylinder 140 in lieu of the hydraulic cylinder 144. In this manner the master cylinder 140 is operated to selectively actuate and release the brake assemblies 354 and 356 as the trailer 30 is being towed.

Figure 22:
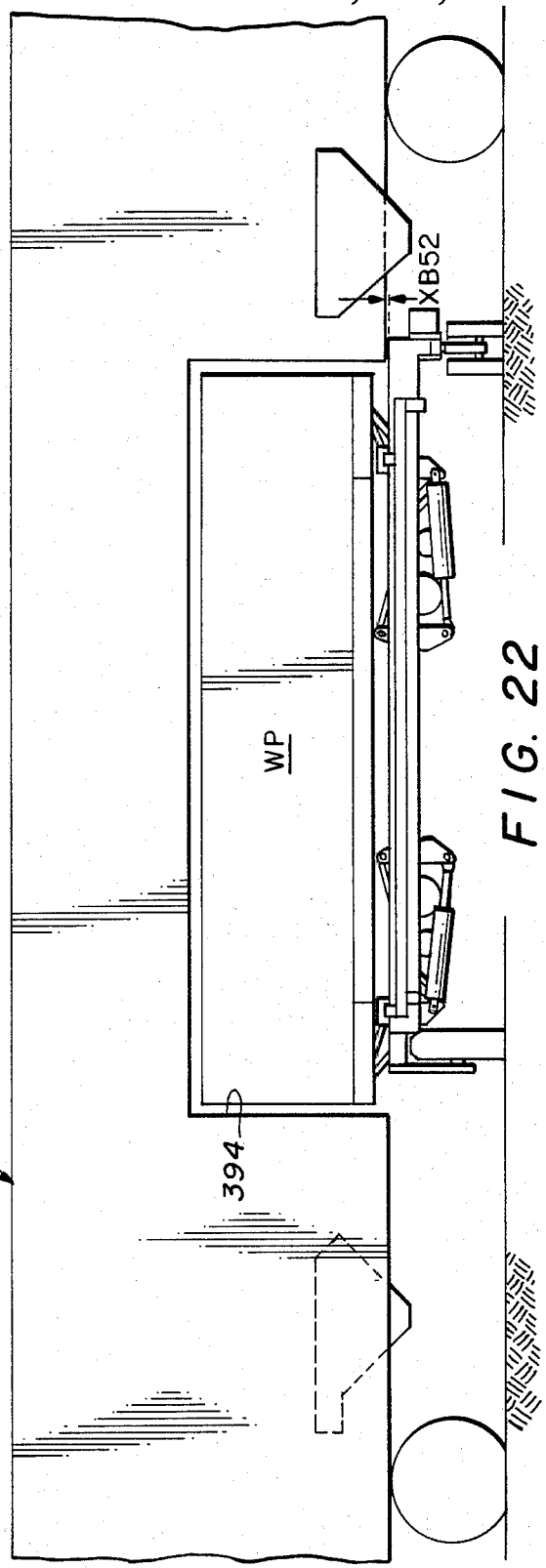
FIGS. 22, 23, 24, 25 and 26 are illustrations of the use of the trailer of FIG. 1 to load weapons packages into various types of aircraft.
Figure 23:
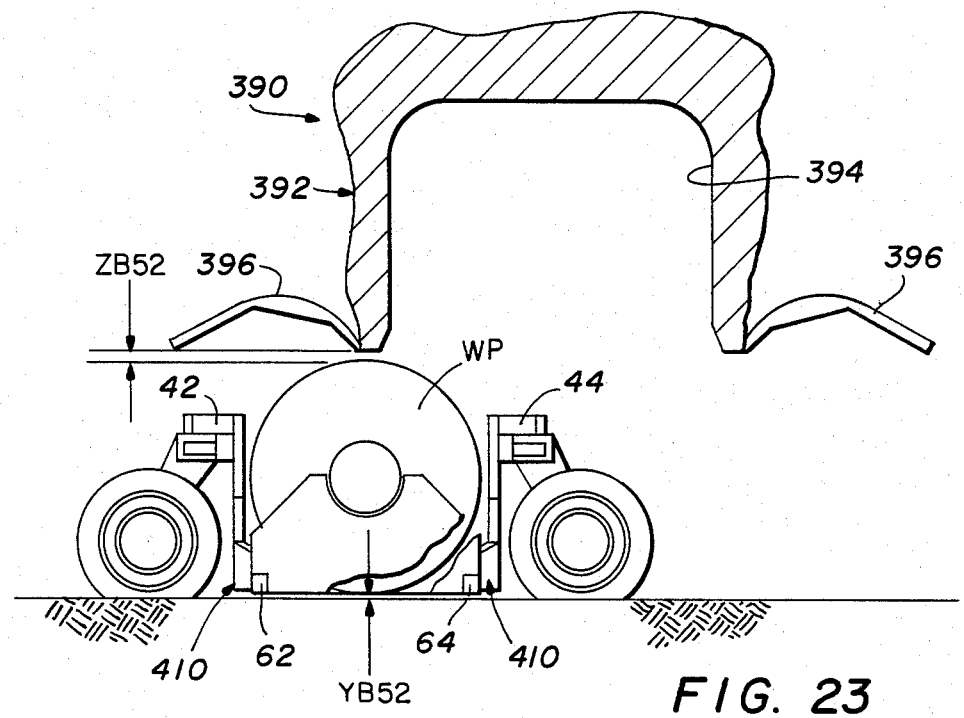
Figure 24:
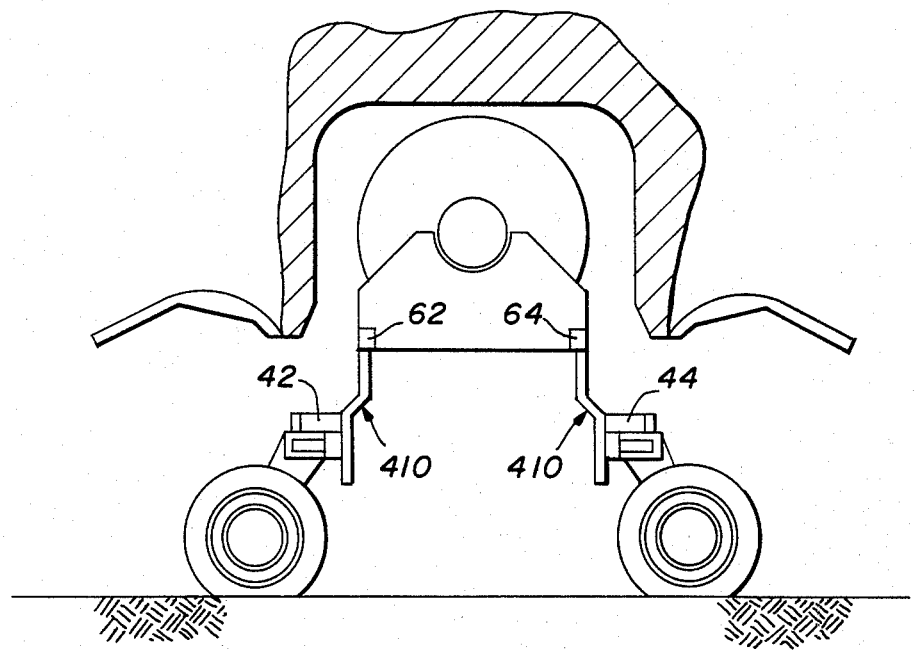

The use of the trailer 30 in loading weapons packages into aircraft is illustrated in FIGS. 22-26. Referring first to FIGS. 22–24, an aircraft 390 of the type known as a B52 Bomber has a fuselage 392. The fuselage 392 in turn has a weapons bay 394 which is normally closed by weapons bay doors 396.

When the trailer 30 of the present invention is utilized to load a weapons package WP into the weapons bay 394 of the aircraft 390, the clearance between the top of the cross beam 46 and the bottom of the fuselage 392 as represented by the dimension XB52 is approximately two inches. When the weapons package WP is positioned as shown in FIG. 23 the clearance between the bottom of the weapons package WP and the underlying surface as represented by the dimension YB52 is approximately one inch, and the clearance between the top of the weapons package and the bottom of the fuselage 392 of the aircraft 390 as represented by the dimension ZB52 is also approximately one inch. As will be apparent by reference to FIG. 24, there is substantial clearance between the lift beams 62 and 64 and the adajacent sides of the weapons bay 394 when the trailer 30 is actuated to lift the weapons package into position to be secured in the weapons bay 394 of the aircraft 390.

Figure 25:
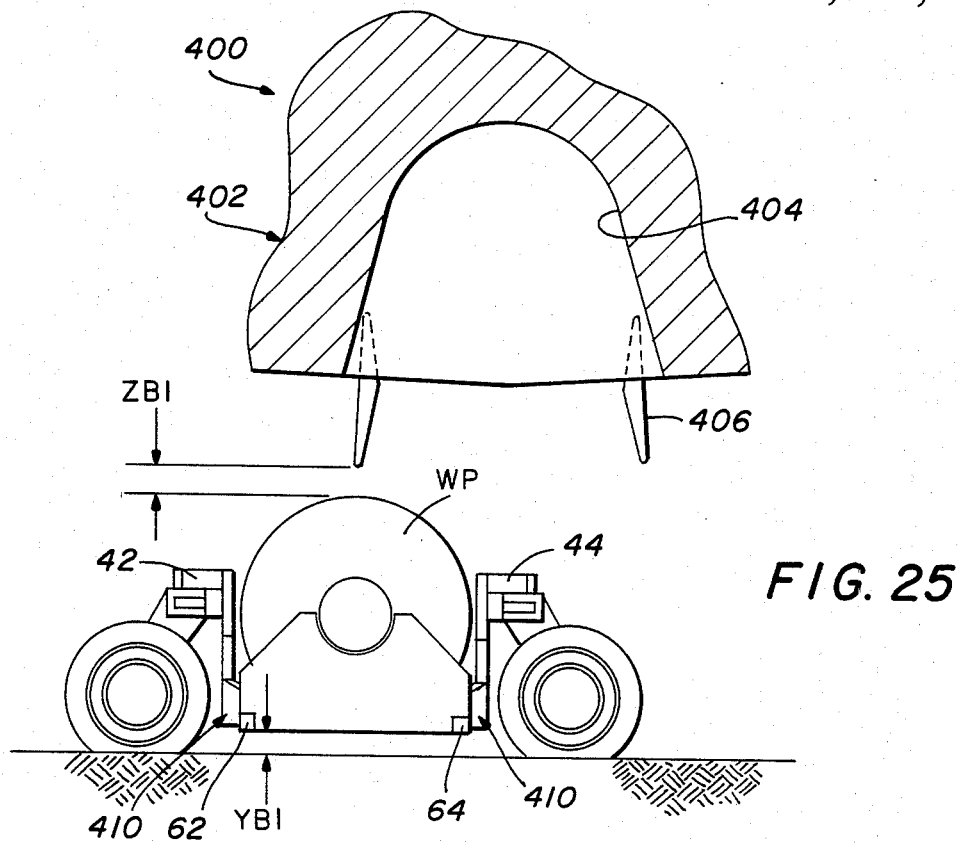
Figure 26:
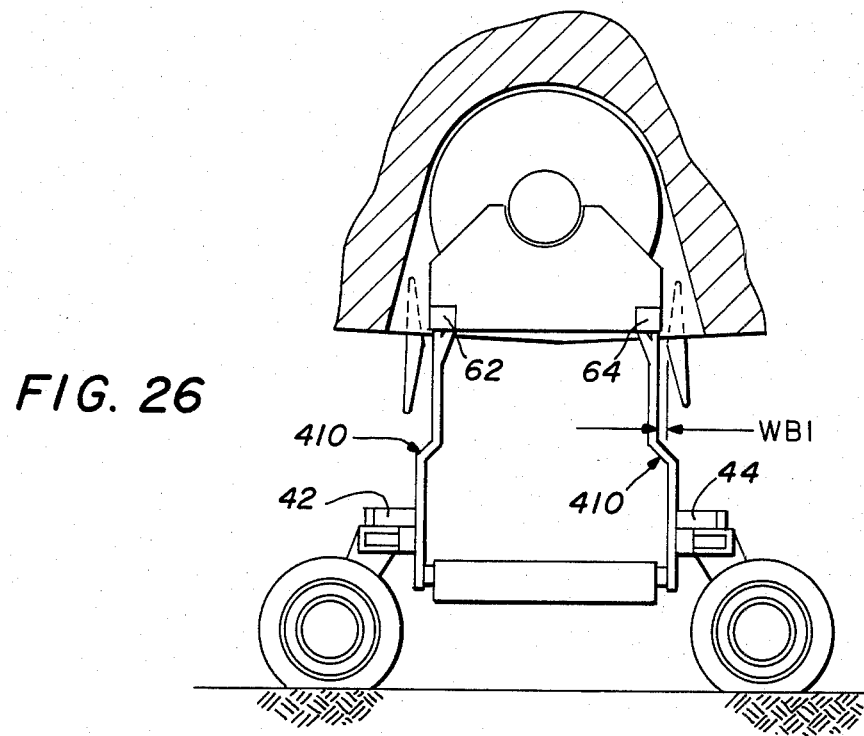

FIGS. 25 and 26 illustrate the use of the trailer 30 to load a weapons package into an aircraft 400 of the type known as a B1 Bomber. The aircraft 400 has a fuselage 402 which is provided with a weapons bay 404. The weapons bay 404 is normally closed by a pair of weapons bay doors 406.

The trailer 30 is initially operated with the weapons package WP positioned as shown in FIG. 25. With the weapons package WP thus positioned the clearance between the bottom of the weapons package and the underlying surface as represented by the dimension YB1 is approximately five inches. Likewise, the clearance between the top of the weapons package and the lowermost points on the opened weapons bay doors as represented by the dimension ZB1 is approximately five inches. When the trailer 30 is subsequently actuated to raise the weapons package into the weapons bay 404 for attachment therein the clearance between the lift beams 62 and 64 and the adjacent surfaces of the weapons bay doors 406 as represented by the dimension WB1 is approximately 2½ inches on each side.

Referring to FIGS. 4, 23, 24, 25 and 26, each of the lift arms 48, 50, 52 and 54 includes an offset or dog leg portion 410. By means of the offset portions 410 the lift beams 62 and 64 are positioned substantially inwardly with respect to the beams 42 and 44. This feature comprises one of the most significant aspects of the invention in that upon downward pivotal movement of the lift arms, the lift beams are positionable at the level of the underlying surface, whereby a weapons package WP supported on a handling adapter HA which is in turn supported on the underlying surface may be lifted directly therefrom without the necessity of using any auxiliary lifting apparatus whatsoever. Of course, the handling adapter HA having the weapons package WP supported thereon may also be lifted from a support, such as the support SP shown in FIG. 4.

Referring specifically to FIG. 26, the provision of the offset portions 410 in the lift arms 48, 50, 52 and 54 is even more significant when the trailer 30 of the present invention is utilized to lift the weapons package WP supported on the handling adpater HA into the weapons bay of an aircraft. Because of the use of the offset portions 410, the lift beams 62 and 64 may be positioned at points that are within the outermost dimensions of the weapons package WP. For this reason the weapons handling trailer 30 of the present invention may be utilized to lift a weapons package into the weapons bay without danger of interference with the weapons bay doors. Again, no auxiliary lifting apparatus is required in order to accomplish this function.

FIGS. 27–36 illustrate a weapons loading trailer 420 comprising a second embodiment of the invention. The trailer 420 incorporates numerous component parts which are substantially identical in construction and function to component parts of the weapons loading trailer 30 illustrated in FIGS. 1–26. Such identical parts are designated by the same reference numerals utilized hereinabove in the description of the trailer 30, but are differentiated therefrom by means of a prime (') designation.

Figure 27:
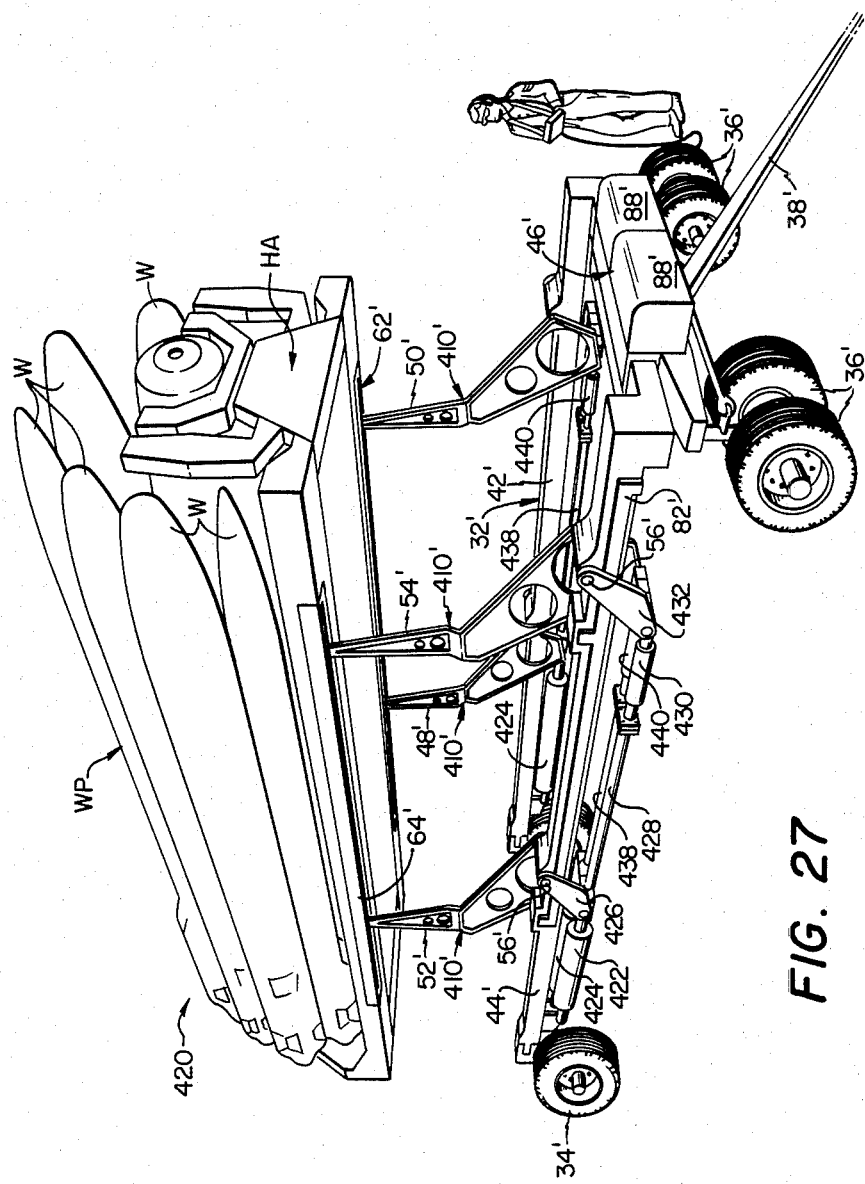
FIG. 27 is a perspective view of an aerial weapons handling trailer incorporating a second embodiment of the invention.
Figure 28:
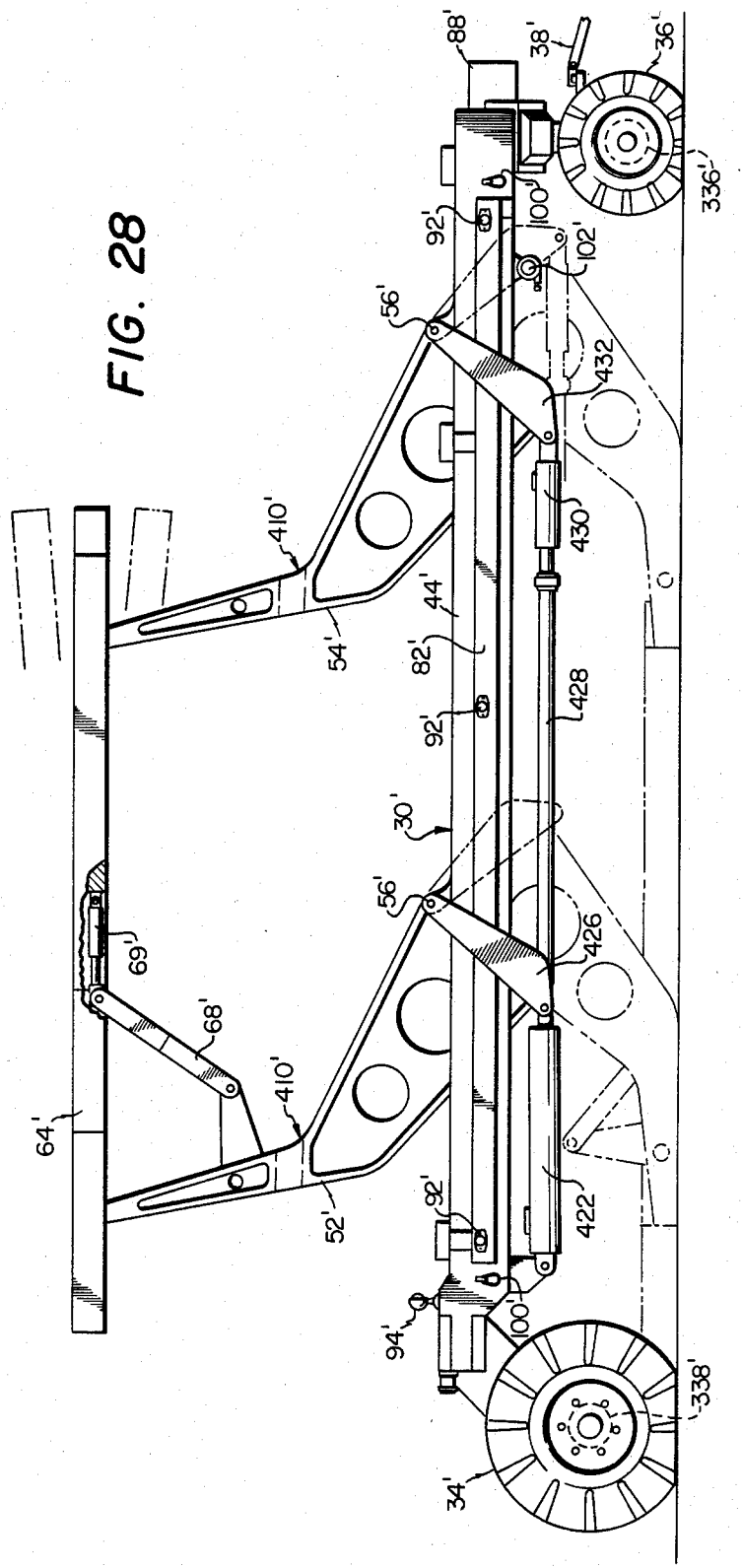
FIG. 28 is a side view of the trailer of FIG. 27.
Figure 29:
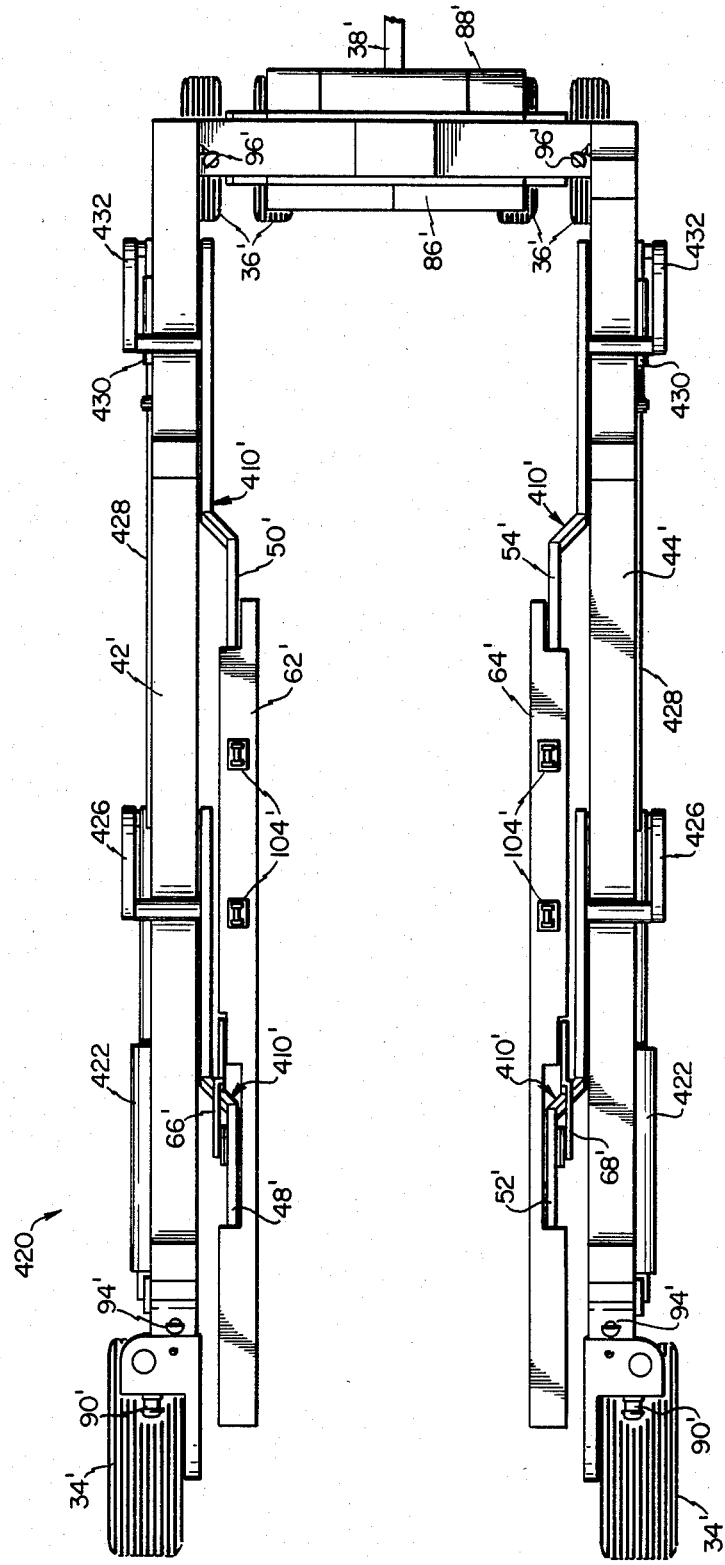
FIG. 29 is a top view of the trailer of FIG. 27.

Referring simultaneously to FIGS. 1 and 27, the lift arms 48 and 52 of the trailer 30 extend in opposite directions from the lift arms 50 and 54. One point of differentiation between the trailers 30 and 420 involves the fact that the lift arms 48' and 52' of the trailer 420 extend in the same direction as and substantially parallel with respect to the lift arms 50' and 54' thereof.

Another point of distinction between the trailers 30 and 420 involves the actuation of the lift arms. In the trailer 30 each of the lift arms 48, 50, 52 and 54 is actuated by a pair of hydraulic cylinders 70 and 76 individual thereto. In the trailer 420 the arms 52' and 54' are operated by a pair of cylinders, including an outboard cylinder 422 and an inboard cylinder 424. Likewise, the lift arms 48' and 50' are concurrently operated by a pair of cylinders, including an inboard cylinder 424 and an outboard cylinder 422.

The outboard cylinder 422 on the left side of the trailer 420 is connected to the lift arm 52' through a bell crank 426 and is connected to the lift arms 54' through a connecting link 428, a tilt cylinder 430 and a bell crank 432. The inboard cylinder 424 on the left side of the trailer is connected directly to the lift arm 52' and is connected to the lift arm 54' through a connecting link 438 and a tilt cylinder 440. The inboard and outboard cylinders 424 and 422 on the right side of the trailer 420 are similarly connected to the lift arm 48' and 50'.

Figure 30:
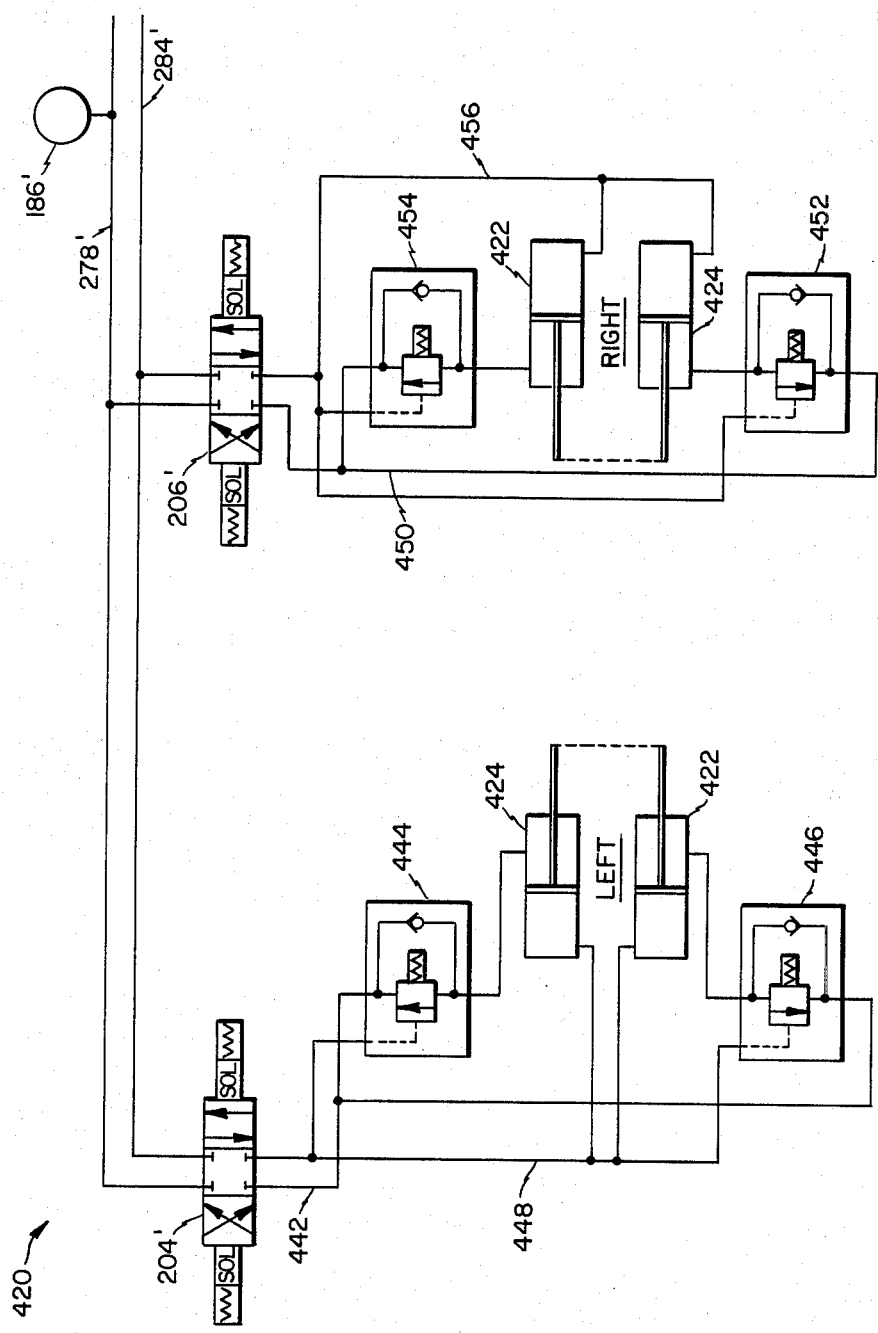
FIGS. 30 and 31 are illustrations of portions of the hydraulic circuitry of the trailer of FIG. 27.

The hydraulic system for the trailer 420 is basically identical to the hydraulic system described hereinabove in conjunction with the trailer 30. Referring to FIG. 30, the portion of the hydraulic system of the trailer 420 which is utilized to effect actuation of the cylinders 422 and 424 is shown. The left hand lift valve 204' controls both the flow of pressurized hydraulic fluid to and the return of spent hydraulic fluid from the cylinders 422 and 424 situated on the left side of the trailer 420. The right hand lift valve 206' similarly controls the flow of hydraulic fluid to and from the cylinders 422 and 424 situated on the right side of the trailer. The valves 204' and 206' are adapted for solenoid actuation. Upon deactuation of their respective solenoids the valves are returned to the positions shown in FIG. 30 under spring action.

When the left hand lift valve 204' is actuated to effect lifting, pressurized hydraulic fluid is directed from the line 278' to a line 442. The pressurized hydraulic fluid flows through the check valves of a pair of load lock valves 444 and 446 and then into the rod ends of the cylinders 422 and 424. Spent hydraulic fluid flows out of the blind ends of the cylinders 422 and 424 through a line 448 and the valve 204' into the line 284'.

When the valve 204' is actuated to effect lowering, pressurized hydraulic fluid is directed from the line 278' through the valve 204' to the line 448. Since the line 448 is also connected to the pilot ports of the load lock valves 444 and 446, the valves 444 and 446 are opened to permit the flow of spent hydraulic fluid out of the rod ends of the cylinders 422 and 424 through the valves 444 and 446, through the line 442 and through the valve 204' to the line 284'. It will thus be understood that the load lock valves 444 and 446 prevent the outflow of hydraulic fluid from the cylinders 422 and 424 except in response to the application of fluid pressure to the line 448.

The right hand lift valve 206' functions similarly to control the flow of hydraulic fluid to and from the cylinders 422 and 424 situated on the right side of the trailer 420. When the valve 206' is actuated to effect lifting, pressurized hydraulic fluid is directed from the line 278' through the valve 206' to a line 450, and from the line 450 through the check valves of a pair of load lock valves 452 and 454 to the rod ends of the cylinders 422 and 424. Spent hydraulic fluid flows out of the blind ends of the cylinders 422 and 424 through a line 456 and the valve 206' to the line 284'. When the valve 206' is actuated to effect lowering pressurized hydraulic fluid is directed to the blind ends of the cylinders 422 and 424 from the line 278' through the valve 206' and the line 456. Since the line 456 is also connected to the pilot ports of the load lock valves 452 and 454, the valves 452 and 454 are opened to permit the outflow of spent hydraulic fluid from the rod ends of the cylinders 422 and 424 through the line 450 and the valve 206' to the line 284'. Again, the load lock valves 452 and 454 prevent the outflow of hydraulic fluid from the rod ends of the cylinders 422 and 424 except upon the application of fluid pressure to the line 456.

Figure 31:
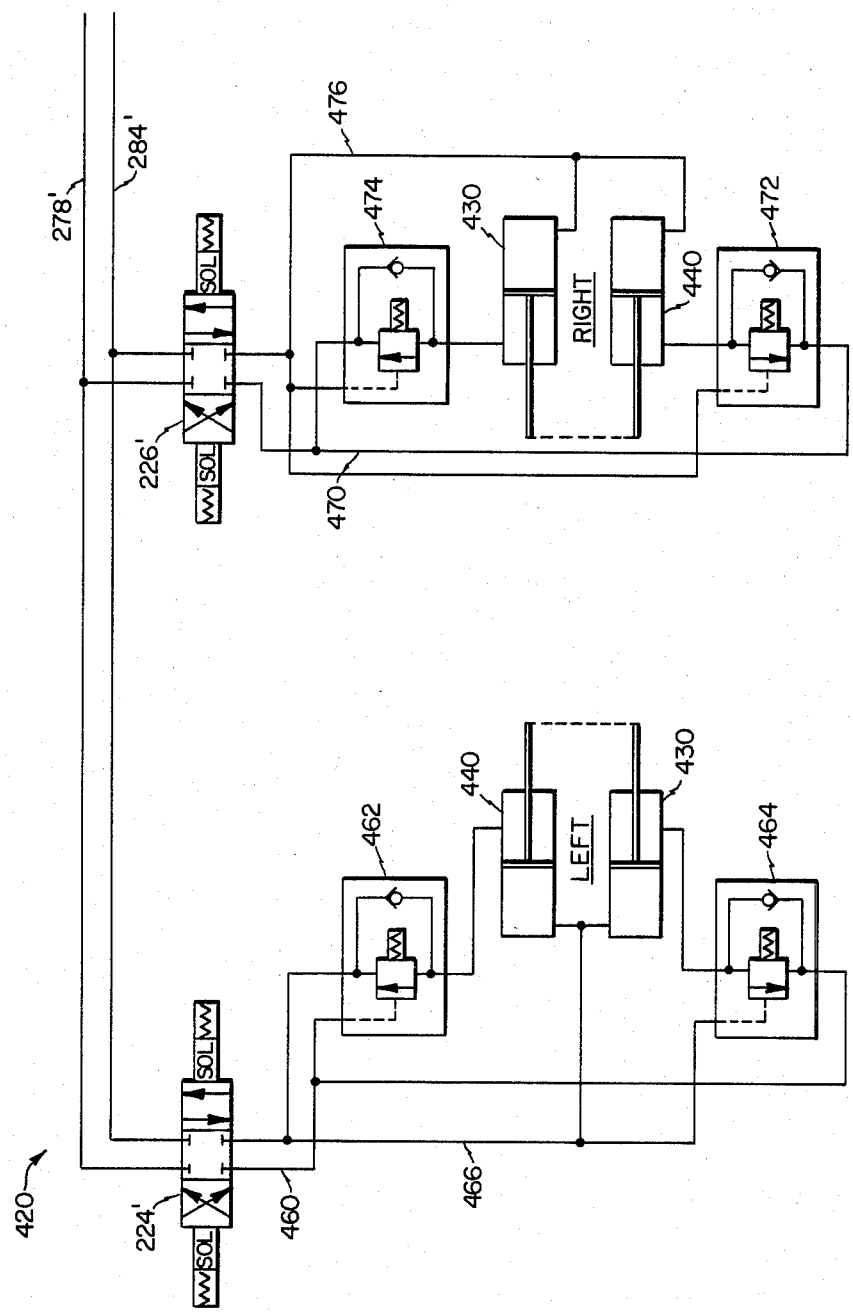

FIG. 31 illustrates the operation of the left hand tilt valve 224' and the right hand tilt valve 226' to control the operation of the tilt cylinders 430 and 440. Valves 224' and 226' are each adapted for solenoid actuation. Upon release of their respective solenoids the valves 224' and 226' are returned to the positions shown in FIG. 31 under spring action.

Upon actuation of the valve 224' to effect upward tilting, pressurized hydraulic fluid is directed from the line 278' through the valve 224' to a line 460. From the line 460 the pressurized hydraulid fluid flows through the check valve of a pair of load lock valves 462 and 464 and then into the rod ends of the cylinders 430 and 440. Spent hydraulic fluid is discharged from the blind ends of the cylinders 430 and 440 through a line 466 and through the valve 224' to the line 284'.

When the valve 224' is actuated to effect downward tilting pressurized hydraulic fluid is directed from the line 278' through the valve 224' to the line 466 and into the blind ends of the cylinders 430 and 440. The line 466 also directs pressurized hydraulic fluid to the pilot ports of the load lock valves 462 and 464. Therefore, the valves 462 and 464 are opened to permit outflow of spent hydraulic fluid from the rod ends of the cylinders 430 and 440 through the valves 462 and 464, the line 460 and the valve 224' to the line 284'. Thus, the load lock valves 462 and 464 prevent the outflow of hydraulic fluid from the rod ends of the cylinders 430 and 440 except upon the application of fluid pressure to the line 466.

The valve 226' operates similarly to control the operation of the tilt cylinders 430 and 440 situated on the right side of the trailer 420. Upon actuation of the valve 226' to effect upward tilting pressurized hydraulic fluid is directed from the line 278' and the valve 226' to a line 470. Pressurized hydraulic fluid flows from the line 470 through the check valves of a pair of load lock valves 472 and 474 to the rod ends of the cylinders 430 and 440. Spent hydraulic fluid is directed out of the blind ends of the cylinders 430 and 440 through a line 476 and the valve 226' to the line 284'.

When the valve 226' is actuated to effect downward tilting pressurized hydraulic fluid is directed from the line 278' through the valve 226' to the line 476 and into the blind ends of the cylinders 430 and 440. The line 476 also directs pressurized hydraulic fluid to the pilot ports of the load lock valves 472 and 474. Therefore, the valves 472 and 474 are opened to permit the outflow of spent hydraulic fluid from the rod ends of the cylinders 430 and 440 through the valves 472 and 474, the line 470 and the valve 226' to the line 284'. Again, the load lock valves 472 and 474 prevent the outflow of hydrualic fluid from the rod ends of the cylinders 430 and 440 except upon the application of fluid pressure to the line 476.

FIG. 32 illustrates the positioning of a typical weapons package WP supported on a handling adapter HA on the trailer 420. The trailer 420 may be utilized to initially receive and lift the weapons package from the underlying surface or from suitable support blocks. After the weapons package has been lifted to a position somewhat above that shown in FIG. 32, transport locks 130' are installed, whereupon the handling adapter HA and the weapons package WP carried thereby are lowered onto the transport locks 130'. This permits the release of hydraulic pressure from the cylinders 422 and 424 during transportation of the weapons package WP by the trailer 420.

In FIG. 33 the positioning of various weapons packages relative to the lift beams 62' and 64' of the trailer 420 is shown. A relatively short weapons package WP is illustrated in phantom lines. Such a weapons package may have an overall length substantially equal to the length of the lift beams 62' and 64'. A relatively long weapons package WP is illustrated in full lines. Such a weapons package is preferably substantially centered relative to the lift beam 62' and 64'.

FIG. 34 shows the use of the trailer 420 to position a weapons package in the weapons bay 394 of the fuselage 392 of a B52 aircraft 390. In such instances the dimension XB52 comprising the clearance between the frame of the trailer 420 and the underside of the fuselage 392' of the aircraft 390' is approximately two inches.

Figure 35:
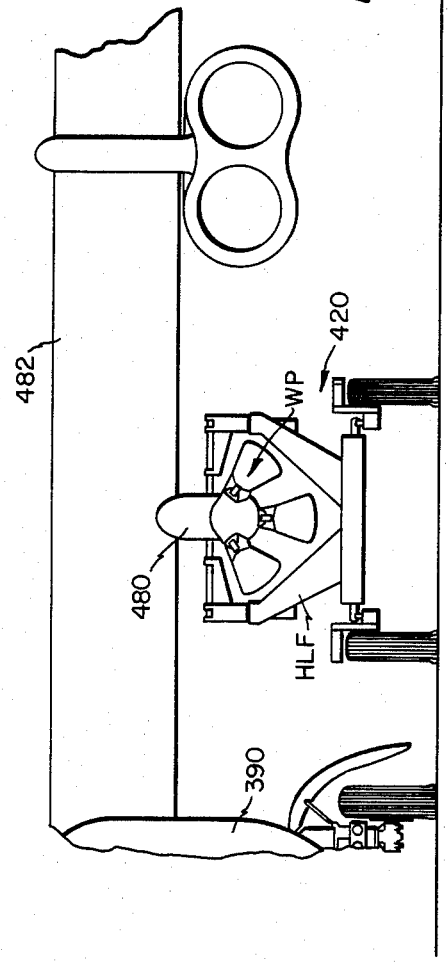
FIGS. 35 and 36 are illustrations of the use of the trailer of FIG. 27 and the attachment of weapons packages to aircraft wing pylons.
Figure 36:
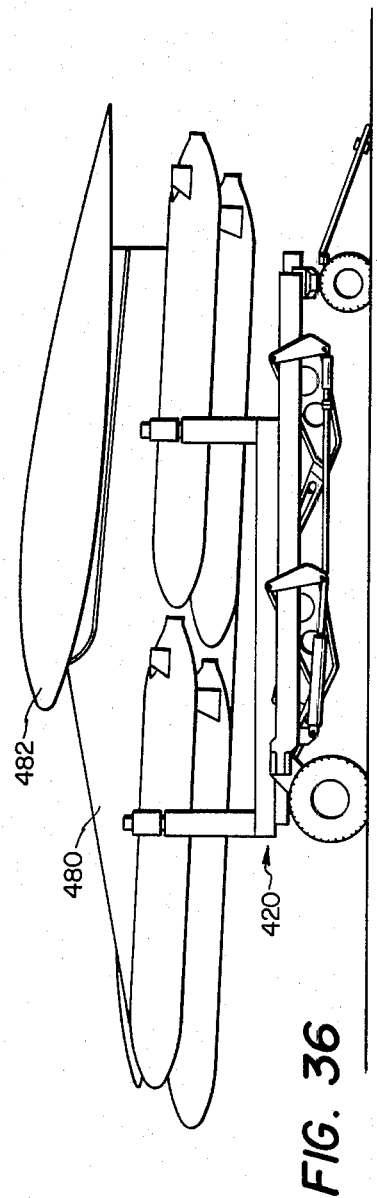

FIGS. 35 and 36 illustrate the use of the trailer 420 to position a weapons package WP for attachment to a wing pylon 480 extending downwardly from a wing 42 of a B52 aircraft 390. In such instances a wing pylon loading/handling frame HLF is utilized to support the weapons package during attachment thereof to the wing pylon 480. The significant consideration illustrated by FIGS. 35 and 36 is that the trailer 420 provides sufficient clearance for movement of the weapons package WP under the pylon 480, and then lifts the weapons package WP upwardly for attachment to the wing pylon 480.

Referring again to FIG. 27, each of the lift arms 48', 50', 52' and 54' of the trailer 420 includes an offset portion 410'. The use of the offset portions 410' is an important feature of the invention in that it permits the positioning of the outside surfaces of the lift beams 62' and 64' at points equal to or narrower than the widest dimension of the weapons package WP supported thereby. This in turn permits the use of the weapons trailer 420 to lift the weapons package into the weapons bay of a bomber or similar aircraft without the necessity of providing auxiliary lifting apparatus.

Figure 37:
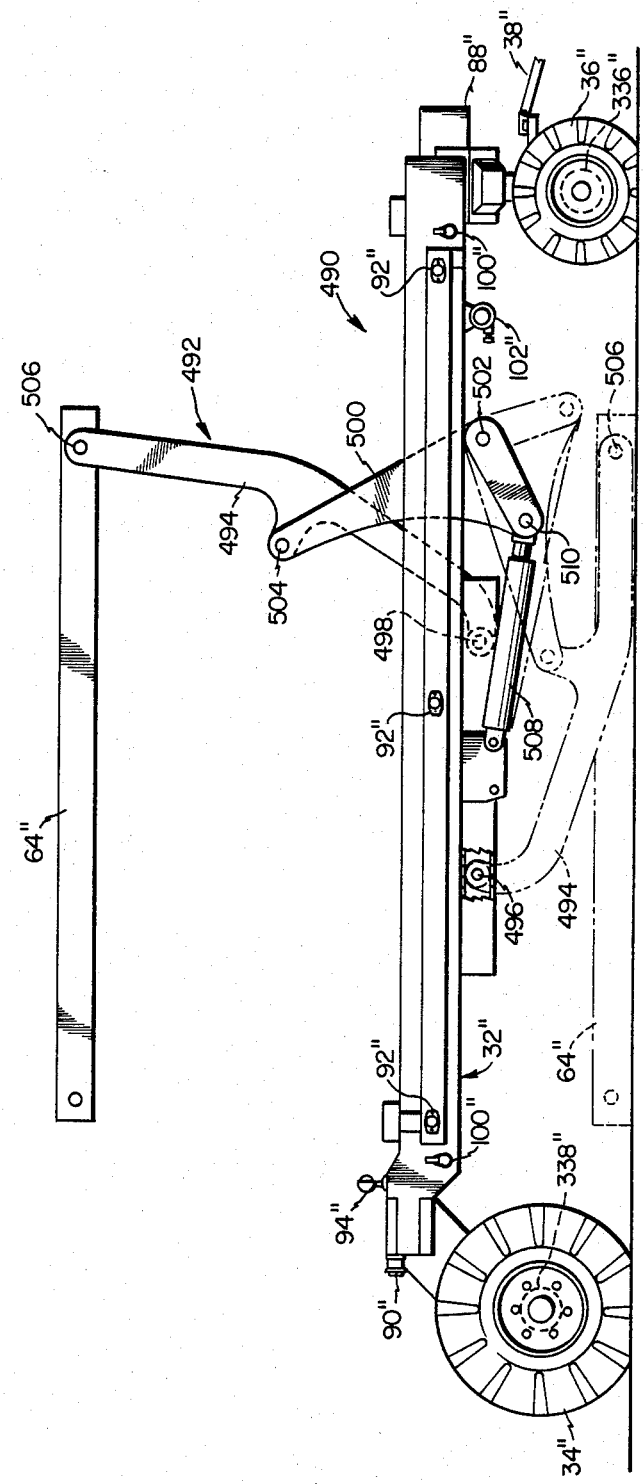
FIG. 37 is a side view of an aerial weapons handling trailer incorporating a third embodiment of the invention.

A weapons loading trailer 490 incorporating a third embodiment of the invention is illustrated in FIG. 37. The weapons loading trailer 490 incorporates numerous component parts which are substantially identical in construction and function to component parts of the weapons loading trailer 30 shown in FIGS. 1–26 and described in conjunction therewith. Such identical component parts are designated in FIG. 37 with the same reference numerals utilized hereinabove in the description of the weapons loading trailer 30, but are differentiated therefrom by means of a double prime (") designation.

The weapons loading trailer 490 includes a mechanism 492 which is utilized to raise and lower the lift beams 62" and 64". The mechanism 492 includes a lift arm 494 which is connected to the frame 32" of the trailer 490 for sliding and pivotal movement with respect thereto. The limits of sliding movement of the point of connection between the lift arm 494 and the frame 32" are illustrated by the points 496 and 498.

A bell crank 500 is pivotally supported on the frame 32" at 502. The bell crank 500 is in turn pivotally connected to the lift arm 494 at point 504. The lift arm 494 is in turn pivotally connected to the lift beam 64" at 506. A pair of hydraulic cylinders 508 are connected to the bell crank 500 at point 510.

Upon retraction of the hydraulic cylinders 508, point 510 is moved leftwardly (FIG. 37). This causes the bell crank 500 to pivot clockwise about point 502, thereby moving point 504 upwardly. Upward movement of point 504 causes the lift arm 494 to pivot counterclockwise, thereby raising point 506 and the lift beam 64" connected thereto. Simultaneously the point of connection between the arm 494 and the frame 32" moves from point 496 to point 498. At the completion of the retraction of the cylinders 508 the component parts of the mechanism 492 are positioned as shown in dashed lines in FIG. 37.

Those skilled in the art will appreciate the fact that the weapons handling trailer 490 actually includes four mechanisms 492. That is, one such mechanism is connected to each end of each of the lift beams 62" and 64". One advantage in the use of the trailer 490 involves the fact that the lift beams 62" and 64" are always supported at the extreme ends thereof. That is, there is no sliding motion at the point of connection of the lift arms 494 to the lift beam 62" and 64". Another advantage involves the compact nature of the mechanism 492, so that the overall length of the trailer 490 may be minimized while maximizing the length of the lift beams 62" and 64".

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

We claim:

1. An aerial weapons handling trailer for receiving, transporting and lifting weapons packages characterized by a predetermined width comprising:

a frame including first and second longitudinally extending beams spaced apart more than the predetermined width and a cross beam interconnecting the front ends of the longitudinally extending beams;

at least two front wheels and at least two rear wheels for supporting the front and rear ends of the frame, respectively;

means supporting the front and rear wheels for pivotal movement between first orientations wherein the wheels support the frame for movement in a direction extending substantially parallel to the longitudinally extending beams of the frame and second orientations wherein the wheels support the frame for movement in a direction extending substantially perpendicular to the longitudinally extending beams of the frame;

at least four lift arms;

means supporting the proximal ends of at least two of the lift arms on the first longitudinally extending beam of the frame for pivotal movement with respect thereto;

means supporting the proximal ends of at least two of the lift arms on the second longitudinally extending beam of the frame for pivotal movement with respect thereto;

hydraulic cylinder means connected between the frame and the lift arms for selective actuation to pivot the lift arms relative to the frame;

first and second lift beams;

means supporting the first lift beam on the distal ends of the lift arms that are pivotally supported on the first longitudinally extending beam of the frame;

means supporting the second lift beam on the distal ends of the lift arms that are pivotally supported on the second longitudinally extending beam of the frame;

the lift arms being pivotable between a first position, wherein the distal ends thereof are disposed adjacent a plane defined by the bottom surfaces of the trailer wheels, and a second position, wherein the distal ends of said lift arms are disposed above the proximal ends thereof, the lift arms including:

(a) first portions, including the proximal ends thereof;

(b) third portions, including the distal ends thereof; and (c) offset portions rigidly interconnecting the first and third portions thereof;

the first portions of the lift arms supported on the first longitudinally extending beam being spaced from the first portions of the corresponding lift arms supported on the second longitudinally extending beam a distance greater than the predetermined width of the weapons package, such that clearance is maintained between the first portions of the lift arms and the weapons package as the lift arms pivot between the first and second positions;

the lift beams having outside surfaces which are spaced apart less than the inner surfaces of said first portions of said lift arms, thereby allowing said lift beams to be lowered between said first portions of said lift arms;

the outwardly facing surfaces of the third portions of the lift arms supported on the first longitudinally extending beam being spaced from the outwardly facing surfaces of the third portions of the corresponding lift arms supported on the second longitudinally extending beam a distance substantially no greater than the distance between the outermost lateral surfaces of said lift beams, thereby allowing said lift arms to pivot upwardly and insert said lift beams, said third portions of said lift arms and the weapons package upwardly through an opening of minimum clearance with respect to the weapons package, such that the third portions of the lift arms do not extend from within the outermost lateral periphery of the weapons package as the lift arms pivot between the first and second positions;

the first and third portions of each lift arm extending from the offset portions thereof to form an obtuse angle, such that when the lift arms are in the first position, the first portions thereof extend downwardly from the frame and the third portions thereof extend substantially parallel to the plane defined by the bottom surfaces of the trailer wheels; and the lift arms being pivotable under the action of the hydraulic cylinder means to position the lift beams beneath a weapons package that is received between the longitudinally extending beams of the frame and thereafter to move the lift beams and the weapons package carried thereby upwardly between the longitudinally extending beams of the frame and further upwardly into the weapons bay of an aircraft.

2. The aerial weapons handling trailer according to claim 1 wherein each of the longitudinally extending beams of the frame is characterized by an inwardly facing surface, the first portion of each lift arm is pivotally connected to one of the longitudinally extending beams of the frame and extends adjacent and substantially parallel to the inwardly facing surface of the longitudinally extending beam of the frame, and the third portion of each lift arm extends from the offset portion parallel to the inwardly facing surface of the longitudinally extending beam of the frame and is positioned substantially inwardly therefrom.

3. The aerial weapons handling trailer according to claim 1 further including means for selectively varying the longitudinal positioning of the lift beams relative to the lift arms.

4. The aerial weapons handling trailer according to claim 1 wherein all of the lift arms extend in substantially the same direction relative to the longitudinally extending beams of the frame, and wherein the distal ends of the lift arms are pivotally connected to the lift beams.

5. The aerial weapons handling trailer according to claim 4 wherein the hydraulic cylinder means is further characterized by:

two sets of hydraulic cylinders;

one set of cylinders connected between the first longitudinally extending beam of the frame and the lift arm pivotally supported thereon; and the other set connected between the second longitudinally extending beam of the frame and the lift arms pivotally supported thereon.

6. The aerial weapons handling trailer according to claim 5 wherein the hydraulic cylinders comprising each set are directly connected to one of the lift arms pivotally supported on the longitudinally extending beam of the frame individual thereto, and further including connecting links extending between the hydraulic cylinders of each set and the other lift arm pivotally supported on the longitudinally extending beam of the frame individual thereto.

7. The aerial weapons handling trailer according to claim 6 wherein each connecting link includes a tilt cylinder for selective actuation to pivot one of the lift arms that is pivotally supported on one of the longitudinally extending beams of the frame relative to the other lift arm pivotally supported thereon, thereby tilting the lift beam which is supported on the distal ends of the lift arms.

8. The aerial weapons handling trailer according to claim 7 wherein each of the hydraulic cylinders of each set has sufficient capacity to support the lift arms connected thereto and the load carried by the lift arms without regard to the other hydraulic cylinder of the set.

9. The aerial weapons handling trailer according to claim 1 wherein each lift arm is connected to one of the longitudinally extending beams of the frame for pivotal and sliding motion with respect thereto, wherein the distal end of each lift arm is pivotally connected to one of the lift beams, and further including a bell crank pivotally supported on the frame and connected between the hydraulic cylinder means and the lift arms, said bell crank being responsive to actuation of the hydraulic cylinder means to pivot the lift arm and thereby raise and lower the lift beam.

10. An aerial weapons handling trailer for receiving, transporting and lifting weapons packages characterized by a predetermined width comprising:

a frame including first and second longitudinally extending beams and a cross beam interconnecting the front ends of the longitudinally extending beams;

the longitudinally extending beams having inwardly facing surfaces spaced apart further than the predetermined width of the weapons package;

at least two front wheels and at least two rear wheels for supporting the front and rear ends of the frame, respectively;

means supporting the front and rear wheels for pivotal movement between first orientations wherein the wheels support the frame for movement in a direction extending substantially perpendicular to the longitudinally extending beams of the frame;

a plurality of lift arms;

means pivotally supporting the proximal ends of at least two of the lift arms on the first longitudinally extending beam of the frame with the lift arms extending substantially parallel to each other;

the lift arms being pivotable between a first position, wherein the distal ends thereof are disposed adjacent a plane defined by the bottom surfaces of the trailer wheels, and a second position, wherein the distal ends of said lift arms are disposed above the proximal ends thereof, the lift arms including:

(a) first portions, including the proximal ends thereof;

(b) third portions, including the distal ends thereof; and (c) offset portions rigidly interconnecting the first and third portions thereof;

the first portions of the lift arms supported on the first longitudinally extending beam being spaced from the first portions of the corresponding lift arms supported on the second longitudinally extending beam a distance greater than the predetermined width of the weapons package, such that clearance is maintained between the first portions of the lift arms and the weapons package as the lift arms pivot between the first and second positions;

a pair of lift beams including a first lift beam supported on the distal ends of the lift arms which are in turn pivotally supported on the first longitudinally extending beam of the frame and a second lift beam supported on the distal ends of the lift arms which are pivotally supported on the second longitudinally extending beam of the frame;

the lift beams having outside surfaces which are spaced apart less than the inner surfaces of said first portions of said lift arms, thereby allowing said lift beams to be lowered between said first portions of said lift arms;

the outwardly facing surfaces of the third portions of the lift arms supported on the first longitudinally extending beam being spaced from the outwardly facing surfaces of the third portions of the corresponding lift arms supported on the second longitudinally extending beam a distance substantially no greater than the distance between the outermost lateral surfaces of said lift beams, thereby allowing said lift arms to pivot upwardly and insert said lift beams, said third portions of said lift arms and the weapons package upwardly through an opening of minimum clearance with respect to the weapons package, such that the third portions of the lift arms do not extend from within the outermost lateral periphery of the weapons package as the lift arms pivot between the first and second positions;

the first and third portions of each lift arm extending from the offset portion thereof to form an obtuse angle, such that when the lift arms are in the first position, the first portions thereof extend downwardly from the frame and the third portions thereof extend substantially parallel to the plane defined by the bottom surfaces of the trailer wheels;

means connecting the distal ends of the lift arms to the lift beams for pivotal movement with respect thereto; and hydraulic cylinder means connected between the frame and lift arms for selective actuation to pivot the lift arms and thereby raise and lower the lift beams.

11. The aerial weapons handling trailer according to claim 10 further including means for selectively varying the longitudinal positioning of the lift beams relative to the lift arms.

12. The aerial weapons handling trailer according to claim 10 wherein the hydraulic cylinder means is further characterized by:

two sets of hydraulic cylinders;

one set of cylinders connected between the first longitudinally extending beam of the frame and the lift arm pivotally supported thereon; and the other set connected between the second longitudinally extending beam of the frame and the lift arms pivotally supported thereon.

13. The aerial weapons handling trailer according to claim 10 wherein the hydraulic cylinders comprising each set are directly connected to one of the lift arms pivotally supported on the longitudinally extending beam of the frame individual thereto, and further including connecting links extending between the hydraulic cylinders of each set and the other lift arm pivotally supported on the longitudinally extending beam of the frame individual thereto.

14. The aerial weapons handling trailer according to claim 13 wherein each connecting link includes a tilt cylinder for selective actuation to pivot one of the lift arms that is pivotally supported on one of the longitudinally extending beams of the frame relative to the other lift arm pivotally supported thereon and thereby tilting the lift beam which is supported on the distal ends of the lift arms.

15. The aerial weapons handling trailer according to claim 14 wherein each of the hydraulic cylinders of each set has sufficient capacity to support the lift arms connected thereto and the load carried by the lift arms without regard to the other hydraulic cylinder of the set.

16. The aerial weapons handling trailer according to claim 10 wherein said lift arms pivot at the proximal ends thereof only about an axis which is substantially horizontal relative to said frame, to lift, lower and support said load.

17. The aerial weapons handling trailer according to claim 16 wherein each of the longitudinally extending beams of said frame is characterized by an inwardly facing surface, and wherein the first and third portions of each of said lift arms extend substantially parallel to the inwardly facing surface of the longitudinally extending beam of said frame to which said lift arm is pivotally connected.

18. The aerial weapons handling trailer according to claim 16 wherein the first and third portions of each of said lift arms remain substantially parallel to a plane which is perpendicular to the relatively horizontal axis about which each said lift arm pivots as said lift arm pivots between said first and second positions.

19. The aerial weapons handling trailer according to claim 10 wherein the predetermined distance above the underlying surface at which said frame is supported is at least as great as one-half the height of said load, such that said load is cradled between the longitudinal beams of said frame when said lift arms are in said first position, and such that when said lift arms are in said second position, said load will be raised above the underlying surface to a height that is substantially greater than the height of said load.

* * * * *